(12) United States Patent
Huang et al.

(10) Patent No.: US 12,319,004 B2
(45) Date of Patent: Jun. 3, 2025

(54) SYSTEM AND METHOD FOR ADDITIVE MANUFACTURING

(71) Applicant: Northwestern University, Evanston, IL (US)

(72) Inventors: Jigang Huang, Evanston, IL (US); Cheng Sun, Evanston, IL (US)

(73) Assignee: Northwestern University, Evanston, IL (US)

( * ) Notice: Subject to any disclaimer, the term of this patent is extended or adjusted under 35 U.S.C. 154(b) by 103 days.

(21) Appl. No.: 18/042,413

(22) PCT Filed: Aug. 24, 2021

(86) PCT No.: PCT/US2021/047285
§ 371 (c)(1),
(2) Date: Feb. 21, 2023

(87) PCT Pub. No.: WO2022/046729
PCT Pub. Date: Mar. 3, 2022

(65) Prior Publication Data
US 2023/0347594 A1    Nov. 2, 2023

Related U.S. Application Data

(60) Provisional application No. 63/069,962, filed on Aug. 25, 2020.

(51) Int. Cl.
*B25J 9/16*       (2006.01)
*B25J 11/00*    (2006.01)
(Continued)

(52) U.S. Cl.
CPC .......... *B29C 64/379* (2017.08); *B29C 64/124* (2017.08); *B29C 64/393* (2017.08);
(Continued)

(58) Field of Classification Search
CPC . B25J 9/16; B25J 11/00; B29C 64/124; B29C 64/129; B29C 64/135;
(Continued)

(56) References Cited

U.S. PATENT DOCUMENTS 9,808,992 B1    11/2017  Linnell et al.
2006/0022379 A1  2/2006  Wicker et al.
(Continued)

OTHER PUBLICATIONS

F. Zhang et al., 3D printing technologies for electrochemical energy storage. *Nano Energy* 40, 418-431(2017).
(Continued)

*Primary Examiner* — Leo B Tentoni
(74) *Attorney, Agent, or Firm* — BELL & MANNING, LLC

(57) ABSTRACT

A system for additive manufacturing includes a multi-material vat that includes a plurality of resins. The system also includes a robotic arm that provides at least six degrees of freedom of motion, where the robotic arm moves with the six degrees of freedom to draw resin out of the multi-material vat to form an object. The system further comprises a processor operatively coupled to the robotic arm and configured to control movement of the robotic arm in the six degrees of freedom.

20 Claims, 29 Drawing Sheets

(51) Int. Cl.
*B29C 64/124* (2017.01)
*B29C 64/227* (2017.01)
*B29C 64/232* (2017.01)
*B29C 64/236* (2017.01)
*B29C 64/241* (2017.01)
*B29C 64/264* (2017.01)
*B29C 64/268* (2017.01)
*B29C 64/379* (2017.01)
*B29C 64/393* (2017.01)
*B33Y 10/00* (2015.01)
*B33Y 30/00* (2015.01)
*B33Y 50/02* (2015.01)
*G05B 19/4099* (2006.01)
*G06F 30/20* (2020.01)
*G06F 113/10* (2020.01)

(52) U.S. Cl.
CPC ............... *B33Y 10/00* (2014.12); *B33Y 30/00* (2014.12); *B33Y 50/02* (2014.12); *G05B 2219/49013* (2013.01); *G06F 2113/10* (2020.01)

(58) Field of Classification Search
CPC ... B29C 64/227; B29C 64/232; B29C 64/236; B29C 64/241; B29C 64/264; B29C 64/268; B29C 64/379; B29C 64/386; B29C 64/393; B33Y 10/00; B33Y 30/00; B33Y 50/00; B33Y 50/02; G05B 19/4099; G05B 2219/49013; G06F 30/20; G06F 2113/10; Y10S 901/05; Y10S 901/09; Y10S 901/16; Y10S 901/17; Y10S 901/18

USPC ........ 264/233, 308, 340, 401, 494; 425/135, 425/174.4, 375; 700/119, 120, 245; 901/5, 9, 16, 17, 18
See application file for complete search history.

(56) References Cited

U.S. PATENT DOCUMENTS

| | | | |
|---|---|---|---|
| 2016/0096331 A1* | 4/2016 | Linnell | ................. B33Y 10/00 264/494 |
| 2016/0185045 A1 | 6/2016 | Linnell et al. | |
| 2016/0279882 A1* | 9/2016 | Davis | ................... B29C 64/393 |
| 2018/0117219 A1 | 5/2018 | Yang et al. | |

OTHER PUBLICATIONS

J. J. Schwartz, A. J. Boydston, Multimaterial actinic spatial control 3D and 4D printing. *Nat Commun* 10, 791 (2019).

B. Cao, N. Boechler, A. J. Boydston, Additive manufacturing with a flex activated mechanophore for nondestructive assessment of mechanochemical reactivity in complex object geometries. *Polymer* 152, 4-8 (2018).

K. Rane, M. Strano, A comprehensive review of extrusion-based additive manufacturing processes for rapid production of metallic and ceramic parts. Advances in Manufacturing 7, 155-173 (2019).

The International Search Report and the Written Opinion issued on Dec. 8, 2021 for international patent application No. PCT/US21/47285; pp. 1-8.

* cited by examiner

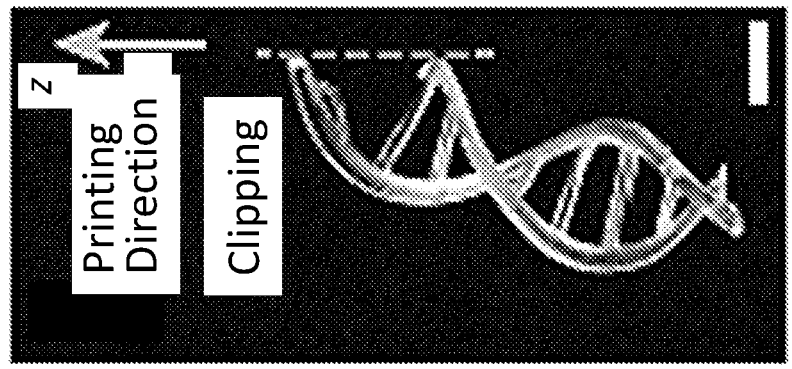
Fig. 1F Uni-directional
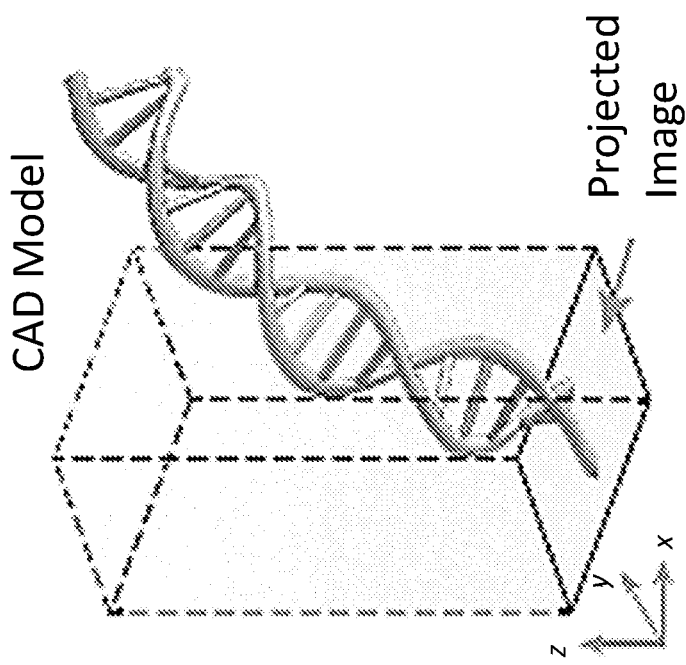
Fig. 1E

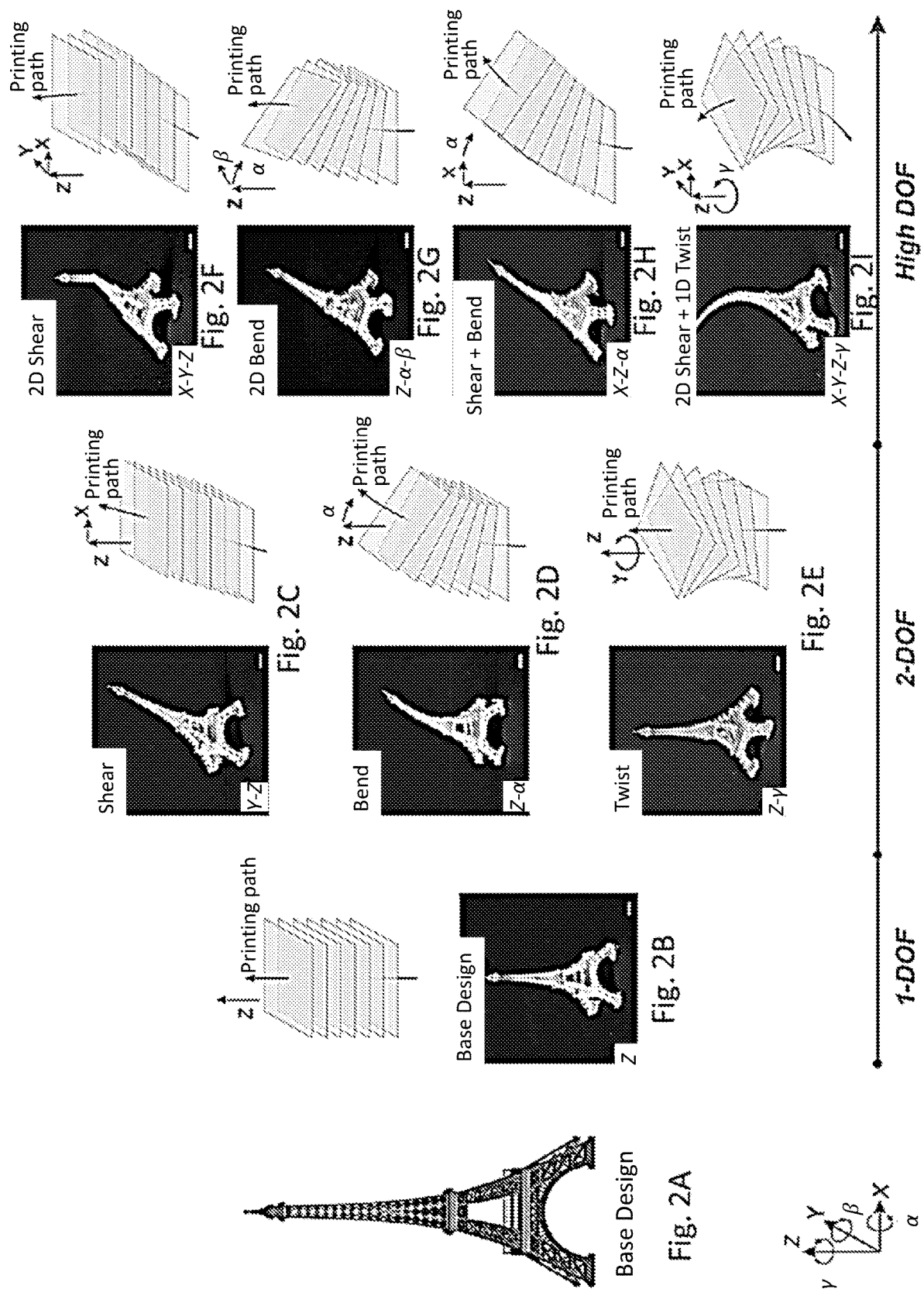

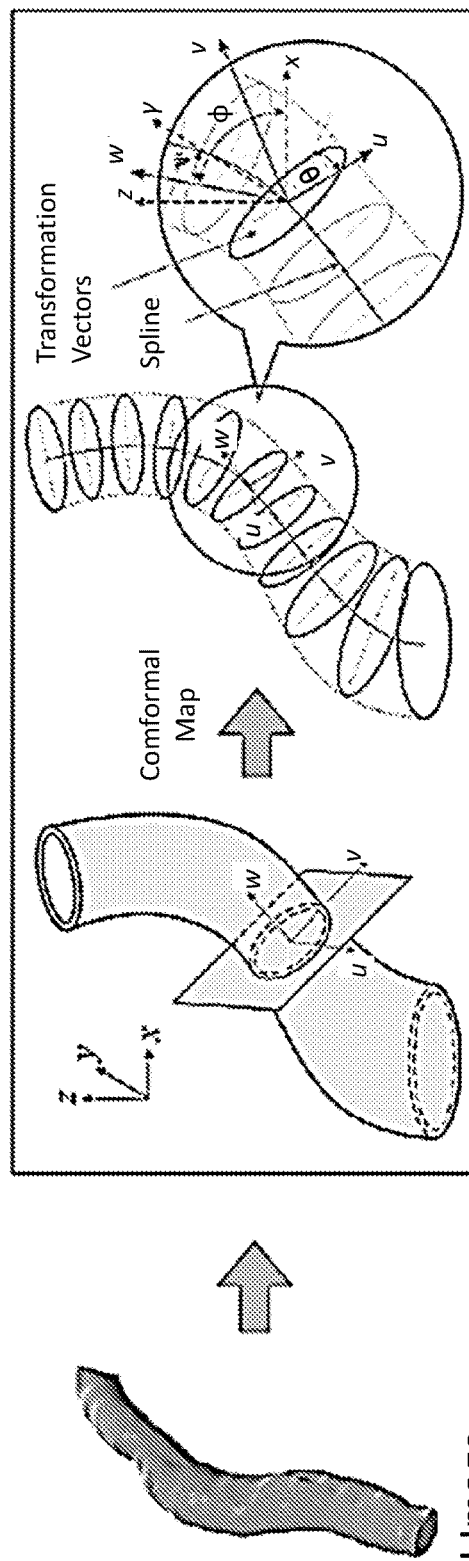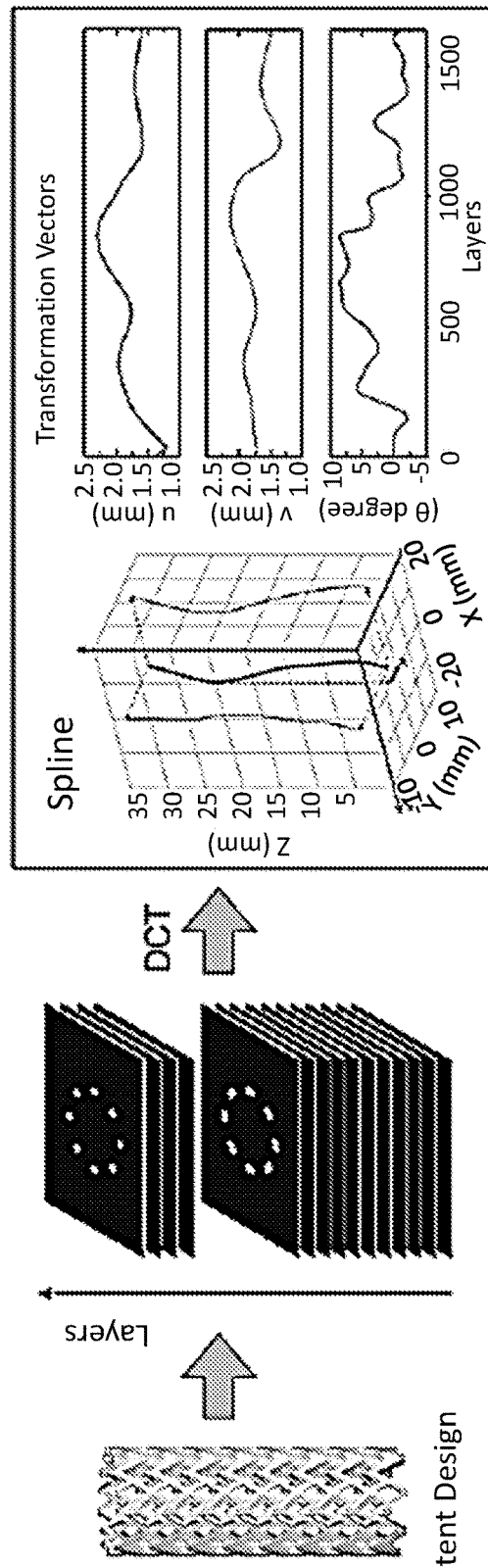
Fig. 3A MRI Image
Fig. 3B Stent Design
Fig. 3C Discrete layers
Fig. 3D
Fig. 3E
Fig. 3F
Fig. 3G Increasing Pressure

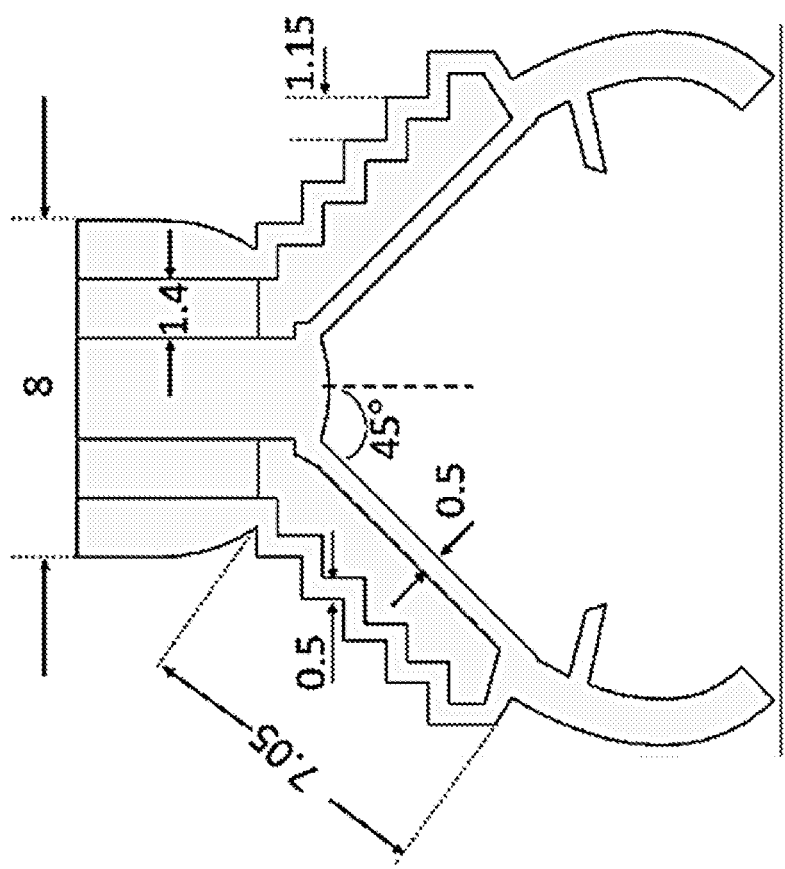
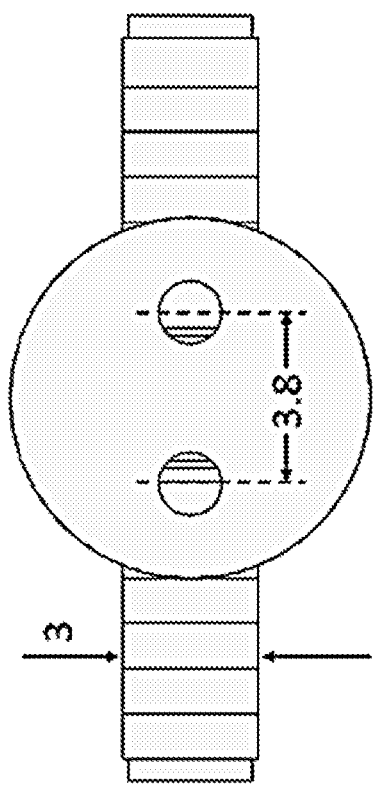
Fig. 8
Section view
Top view

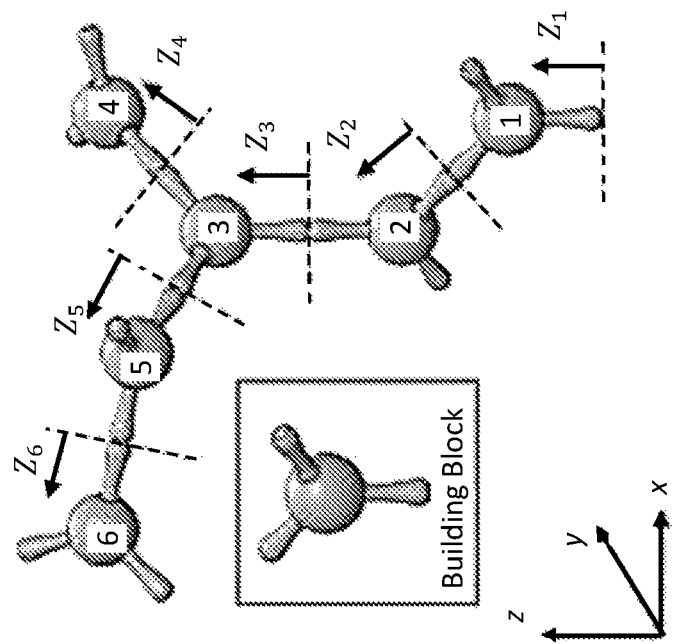
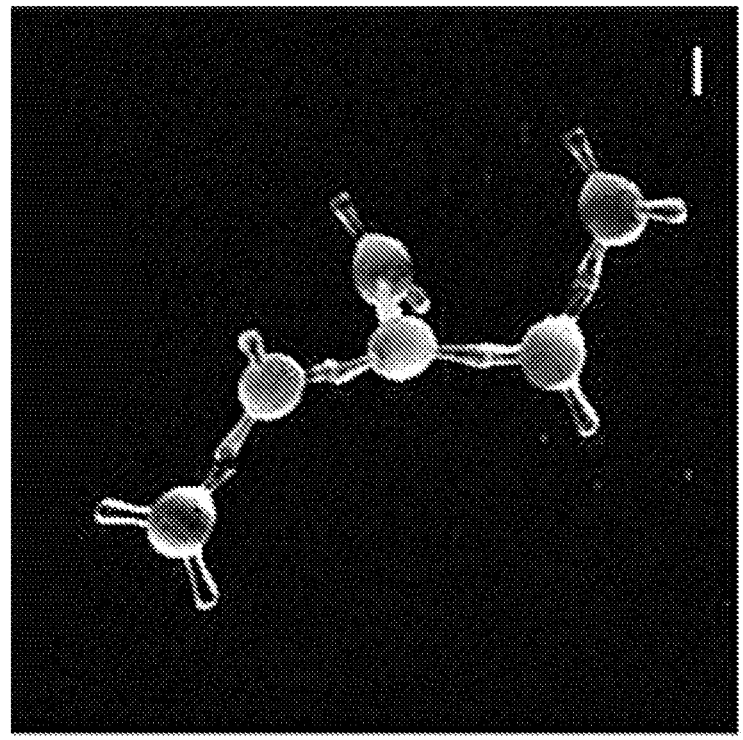
Fig. 14A
Fig. 14B

SYSTEM AND METHOD FOR ADDITIVE MANUFACTURING

CROSS-REFERENCE TO RELATED APPLICATION

The present application is a National Stage of International Application No. PCT/US21/47285, filed Aug. 24, 2021, which claims the priority benefit of U.S. Provisional Patent App. No. 63/069,962 filed on Aug. 25, 2020, the entire disclosures of both of which are incorporated by reference herein.

REFERENCE TO GOVERNMENT RIGHTS

This invention was made with government support under HL141933 awarded by the National Institutes of Health (NIH) and under 1530734 awarded by the National Science Foundation (NSF). The government has certain rights in the invention.

BACKGROUND

Three-dimensional (3D) printing or additive manufacturing is the process for building complex geometries via successive addition of materials based on a digital model. The commonly implemented forms of 3D printing encompass many processes including photopolymerization, material extrusion, selective laser sintering and directed energy deposition, and layer lamination. While 3D printing as a whole originated as a tool to create aesthetic or non-functional prototypes from the digital model, its precision and material selections have been substantially improved over the past decades. These advancements have led to an increase in direct fabrication of a diverse range of functional devices, including energy storage, electronics, microfluidics, robotic manipulators, biomedical devices, as well as large scale building construction, aircraft and automobile prototypes, etc. In recent years, much research in polymers and composite 3D printing has been dedicated to continuous processes, such as Continuous Liquid Interface Production (CLIP), High-area rapid printing (HARP), Dual Wavelength photopolymerization, and other continuous volumetric fabrication methods.

SUMMARY

An illustrative system for additive manufacturing includes a multi-material vat that includes a plurality of resins. The system also includes a robotic arm that provides at least six degrees of freedom of motion. The robotic arm moves with the six degrees of freedom to draw resin out of the multi-material vat to form an object. The system also includes a processor operatively coupled to the robotic arm and configured to control movement of the robotic arm in the six degrees of freedom.

In some embodiments, the system also includes a motorized stage to which the multi-material vat is mounted, where the motorized stage moves the multi-material vat to control which resin from the plurality of resins is used. The system can also include a solvent bath, where the robotic arm is configured to rinse the object in the solvent bath prior to switching from a first resin to a second resin during manufacturing of the object. In such an embodiment, the first resin and the second resin can both be included in the multi-material vat. The system can also include an oxygen-permeable membrane at a bottom of the multi-material vat.

In some embodiments, the processor is configured to execute a dynamic conformal slicing (DCS) algorithm to form a conformal map of a surface model of the object. The processor can use the DCS algorithm to discretize the surface model into a plurality of slicing layers. The processor can also use the DCS algorithm to minimize a cross-section area of each slicing layer in the plurality of slicing layers by varying angles of the surface normal. In an illustrative embodiment, the DCS algorithm is configured to identify a centroid of each slicing layer and form a spline of the conformal map by sequentially connecting the centroids of the plurality of slicing layers. The DCS algorithm can be configured to represent each slicing layer by a local frame with respect to a reference frame. The DCS algorithm can also be configured to approximate each slicing layer as a shape that is represented by a conformation vector. In one such embodiment, the conformation vector comprises (u, v, $\Theta$), where u and v represent dimensions along two principle axes of the shape, and where $\Theta$ represents in-plane rotation of the two principle axes. In some embodiments, the shape can be an ellipse. The system can also include a light engine configured to receive bitmaps corresponding to the slicing layers on a layer-by-layer basis during manufacture of the object.

An illustrative method for performing additive manufacturing includes storing, in a memory, a design of an object to be printed. The method also includes controlling, by a processor operatively coupled to the memory, a position of a multi-material vat that includes a plurality of resins. The method further includes controlling, by the processor, a robotic arm having at least six degrees of freedom of motion such that the robotic arm moves with the six degrees of freedom to draw resin out of the multi-material vat to form the object. In some embodiments, controlling the position of the multi-material vat comprises controlling a motorized stage to which the multi-material vat is mounted. The method can also include controlling, by the processor, the robotic arm to rinse the object in a solvent bath during fabrication and prior to switching from a first resin to a second resin.

In some embodiments, the method further includes executing, by the processor, a dynamic conformal slicing (DCS) algorithm to form a conformal map of a surface model of the object. The method can also include using the DCS algorithm to discretize the surface model into a plurality of slicing layers. The method can also include minimizing, by the processor, a cross-section area of each slicing layer in the plurality of slicing layers by varying angles of a surface normal. Additionally, the method can include identifying, by the processor, a centroid of each slicing layer and forming a spline of the conformal map by sequentially connecting the centroids of the plurality of slicing layers.

BRIEF DESCRIPTION OF THE DRAWINGS

Illustrative embodiments of the invention will hereafter be described with reference to the accompanying drawings, wherein like numerals denote like elements.

FIG. 1E depicts how printing volume is restricted to the size of the projected imaging area in traditional unidirectional printing processes in accordance with an illustrative embodiment.

FIG. 1F depicts a clipped structure obtained using the traditional unidirectional 3D printing process of FIG. 1E in accordance with an illustrative embodiment.

FIG. 2A depicts the classic Eiffel tower model as a representative base design in accordance with in illustrative embodiment.

FIG. 2B depicts the Eiffel tower model decomposed into a series of horizontal slicing layers, which can be replicated via 1-DOF stage translation along the z-axis in accordance with an illustrative embodiment.

FIG. 2C depicts the shear deformation mode in accordance with an illustrative embodiment.

FIG. 2D depicts the bend deformation mode in accordance with an illustrative embodiment.

FIG. 2E depicts the twist deformation mode in accordance with an illustrative embodiment.

FIG. 2F depicts two-dimensional (2D) shear in accordance with an illustrative embodiment.

FIG. 2G depicts 2D bend in accordance with an illustrative embodiment.

FIG. 2H depicts one-dimensional (1D) shear and 1D bend in accordance with an illustrative embodiment.

FIG. 2I depicts 2D shear and 1D twist in accordance with an illustrative embodiment.

FIG. 3A shows a reconstructed solid model (STL, stereolithography) of a section of the human thoracic aorta obtained from the magnetic resonance imaging (MRI) in accordance with an illustrative embodiment.

FIG. 3B depicts a solid model of the deterministic vascular scaffold design in accordance with an illustrative embodiment.

FIG. 3C depicts corresponding planar-layer slices in accordance with an illustrative embodiment.

FIG. 3D depicts the conformal map with conformal slicing to minimize the section area in accordance with an illustrative embodiment.

FIG. 3E depicts a skeleton formed from a series of sliced layers that have been sequentially attached to the center spline at the centroid points in accordance with an illustrative embodiment.

FIG. 3F depicts the calculated conformal map of the blood vessel model illustrated in FIG. 3A in accordance with an illustrative embodiment.

FIG. 3G represents a transformation matrix and shows how discrete layers are approximated by an elliptical shape in accordance with an illustrative embodiment.

FIG. 8 depicts the design dimensions of the actuator (in millimeters) in accordance with an illustrative embodiment.

FIG. 14A depicts a multi-axis printing strategy and includes a building block CAD model inset in accordance with an illustrative embodiment.

FIG. 14B depicts a successfully fabricated structure made using a multi-axis printing technique in accordance with an illustrative embodiment.

DETAILED DESCRIPTION

Three-dimensional (3D) printing creates complex geometries via layer-by-layer materials addition. While 3D printing has been historically perceived as the static addition of build layers, the proposed methods and systems treat 3D printing as a dynamic assembly process. In this context, described herein is a new 3D printing process that executes full degree-of-freedom (DOF) transformation of individual build layers while utilizing continuous fabrication techniques. Individually manipulating each build layer within the sequential layered manufacturing process allows one to digitally transform 3D printed parts on-the-fly, to print conformal geometry to ensure custom fitting of vascular scaffolds, to realize multi-axis, multi-materials 3D printing of soft robotic actuators, etc. These capabilities are important to the continuing evolution of 3D printing processes, from creating visual prototypes to direct manufacturing of industrial products.

Figures 1A, 1B:
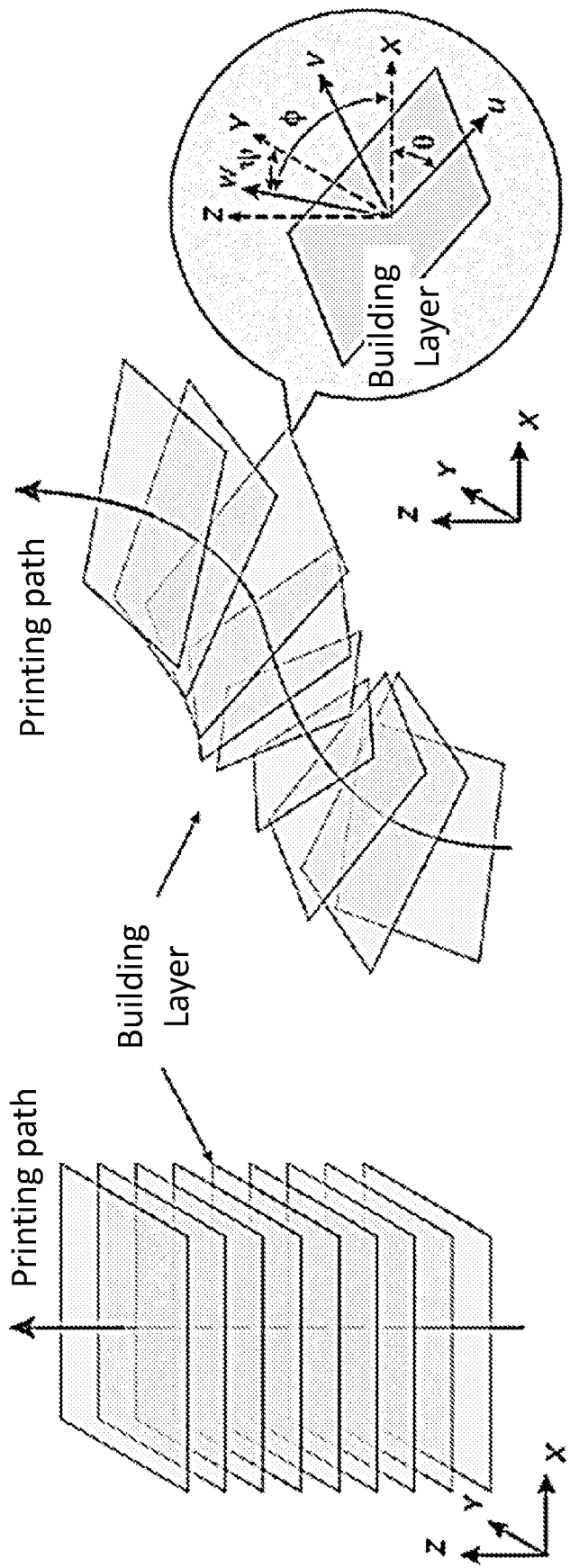
FIG. 1A depicts a unidirectional motion control strategy employing a single degree of freedom stage motion.
FIG. 1B depicts layering by a system for performing additive manufacturing with 6-DOF motion in accordance with an illustrative embodiment.

Traditional 3D printers employ planar-layer printing strategies that have rather limited flexibility in customization and multi-materials integration. Originally developed for the sole purpose of rapid prototyping, the planar-layer printing process slices the digital models along the z-axis to generate a set of horizontal build layers in x-y plane. Those layers are sequentially stacked from bottom-up to create a physical replica of the digital model. FIG. 1A depicts a unidirectional motion control strategy employing a single degree of freedom stage motion.

After more than three decades, this standard procedure remains the popular choice in most of the commercial 3D printers possessing 3-DOF Cartesian motion. Despite its popularity, the limited 1-DOF stage motion along the z-axis imposes serious constraints in 3D printing complex geometries. Recognizing how multi-axis machines are capable of producing freeform geometries with better quality and efficiency as compared to the 3-axis machines, the inventors have explored new slicing and printing strategies beyond the 3-DOF Cartesian motion. It has been found that methods employing high-DOF stage motion by a Fused Deposition Modeling (FDM) process enable support-free 3D printing. It has also been found that a computed axial lithography (CAL) method prints entire complex objects via angular accumulation of a dynamically evolving light pattern in a cylindric coordinate system. These methods demonstrate the ability to handle complex geometries with improved speed and surface finishing.

The inventors have further expanded on these techniques by allowing freeform manipulation of each build layer during the layered manufacturing process. FIG. 1B depicts layering by a system for performing additive manufacturing with 6-DOF motion in accordance with an illustrative embodiment. As schematically illustrated in FIG. 1B, the newfound fabrication flexibility for reconstituting build layers into the final printed 3D structure offers attractive potential towards customization and multi-materials integration. The transformation of the build layer is generally represented by the local frame (u, v, w) in reference to the reference frame (x, y, z), where u-v plane coincides with the build layer and w-axis represents the normal direction. Thus, such transformation possesses 6-DOF, which comprises 1-DOF translation along the normal direction, 3-DOF rotation of surface normal (2-DOF out-of-plane rotation+1-DOF in-plane rotation), and 2-DOF scaling within the u-v plane. This is in addition to the 2-DOF contained within the 2D geometry of the build layer. In contrast to the traditional printing strategy through z-axis layer stacking, untethering the build layer fabrication from that single axis unlocks the ability to reconstitute the 3D objects with added manufacturability, such as custom design transformations, conformal geometry, and multi-material integration. In alternative embodiments, fewer, additional, and/or different degrees-of-freedom may be used by the system.

Figure 1C:
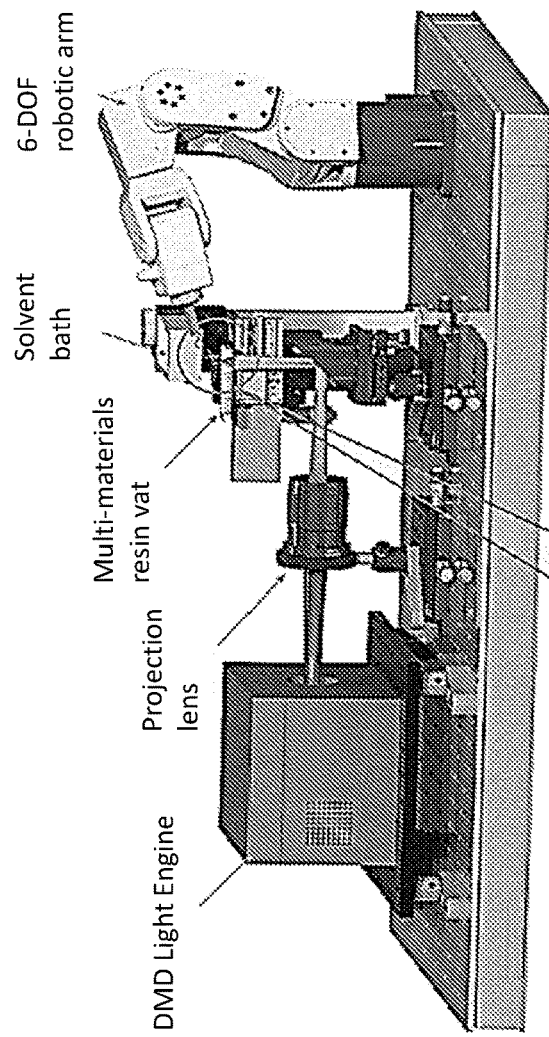
FIG. 1C depicts a system for performing additive manufacturing with 6-DOF motion in accordance with an illustrative embodiment.

The inventors have developed a freeform parallel microstereolithography (FF-POL) process to demonstrate the aforementioned concepts. FIG. 1C depicts a system for performing additive manufacturing with 6-DOF motion in accordance with an illustrative embodiment. The system uses a high-precision 6-axis robotic arm (e.g., Meca500, Mecademic Inc.) with repeatable positioning accuracy of 5 micrometers (μm) to facilitate 6-DOF sample stage motion. Alternatively, a different type of robotic arm may be used. For the interest of the printing speed, surface finishing, and mechanical homogeneity, the 6-DOF manufacturability was incorporated into a Micro-Continuous Liquid Interface Production (μCLIP) process. The proposed system utilizes a light engine (e.g., Wintech PRO6600) featuring a 4K resolution digital micromirror device (e.g., DMD, Texas Instruments, 3860×2160 pixels) and a 385 nanometer (nm) ultraviolet (UV) light source. In alternative embodiments, a different type of light engine, micromirror device, and/or light source may be used.

In an illustrative embodiment, patterned UV light is projected though an oxygen-permeable membrane at the bottom of a Multi-materials resin vat with a pixel resolution of 5×5 μm². The resin vat is attached to a separate motorized stage, allowing switching of the photocurable resins for multi-materials 3D printing. To minimize the cross-contamination of the various resins during a multi-materials print job, the robotic arm will carry the printed part and rinse it in the solvent bath to remove the residual resin, as shown in FIG. 1C. The use of an oxygen permeable membrane creates an oxygen-rich region, effectively inhibiting the photopolymerization in the surrounding region under illumination of the projected UV light. This prevents the adhesion of the polymerized structure to the optical windows, making it possible to create 3D structures under a continuous stage motion and to significantly reduce the fabrication time. While the stated sequential process involves individual layer manipulation, continuous projection of UV and oxygen inhibition during printing allow continuous polymerization of each layer into the subsequent layer, which maintains mechanical homogeneity and avoids traditional sequential layer-by-layer defects.

Figure 1D:
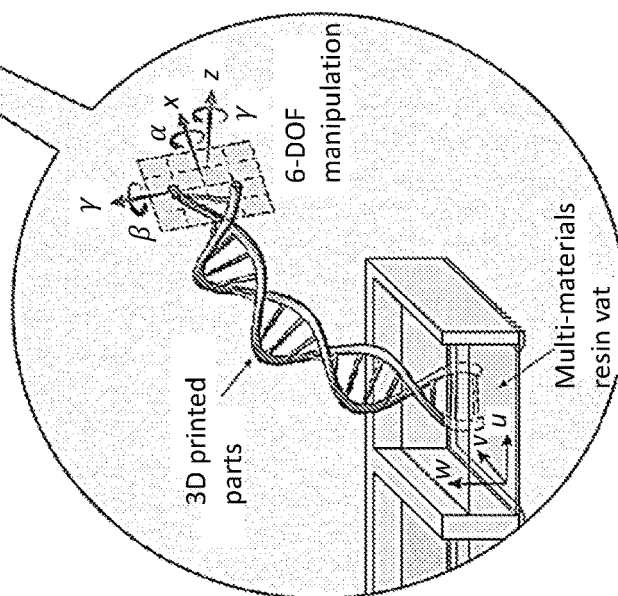
FIG. 1D illustrates how the 6-DOF manipulation of the build layer is implemented via the relative motion among two reference frames in accordance with an illustrative embodiment.
Figure 1H:
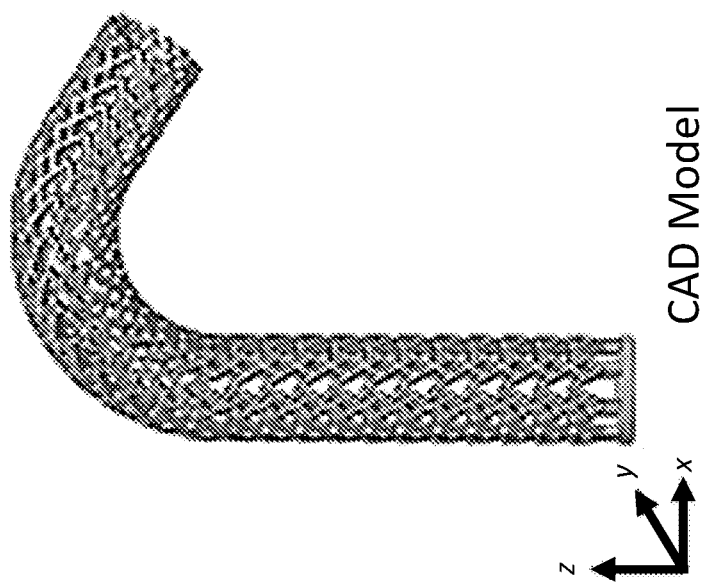
FIG. 1H depicts a CAD model of an obtuse angle bend stent structure featuring a downfacing section in accordance with an illustrative embodiment.

FIG. 1D illustrates how the 6-DOF manipulation of the build layer is implemented via the relative motion among two reference frames in accordance with an illustrative embodiment. More specifically, FIG. 1D shows how the stationary local frame (u, v, w) coincides with the projected image plane and how the moving reference frame (x, y, z) attaches to the end of the robotic arm. The 3D printing is accomplished via controlling the display on the dynamic mask and the synchronized 6-DOF motion of the robotic arm. Thus, the bent double helix model shown in FIG. 1D can be volumetrically drawn out from the liquid resin using the robotic arm in a continuous curvilinear motion. FIG. 1E depicts how printing volume is restricted to the size of the projected imaging area in traditional unidirectional printing processes in accordance with an illustrative embodiment.

The representative examples of FIG. 1 are used herein to highlight the difference between the conventional unidirectional printing process and the proposed FF-PµSL process. As the printable volume in conventional unidirectional printing process (rectangular cuboid region in FIG. 1E) is constrained by the maximum projected image size, the printed structure becomes clipped at the boundary of the projected image (dashed line, FIG. 1F). FIG. 1F depicts a clipped structure obtained using the traditional unidirectional 3D printing process of FIG. 1E in accordance with an illustrative embodiment. In contrast, FF-PµSL allows the bent double helix model to be volumetrically drawn out from the liquid resin using robotic arm in a continuous curvilinear motion. FIG. 1G depicts a full bent double helix structure printed via a 3D curvilinear printing path using a multi-axis printing process in accordance with an illustrative embodiment. FIG. 1H depicts a CAD model of an obtuse angle bend stent structure featuring a downfacing section in accordance with an illustrative embodiment. Such a shape cannot be fabricated using conventionally unidirectional printing process. FIG. 1I depicts an attempt to print the shape of FIG. 1H using a conventional unidirectional printing process in accordance with an illustrative embodiment. Successful fabrication of the downfacing section shown in FIG. 1H can be implemented via the addition of sacrificial supporting structures. FIG. 1J depicts sacrificial supporting structures used to facilitate printing of the shape of FIG. 1H in accordance with an illustrative embodiment. However, it is noted that for the small structures shown here (where strut size is in the 150 µm range), it can be rather challenging to remove the supporting structures manually, without compromising the surface quality and structural integrity of the 3D printed stent structure.

Figure 1G:
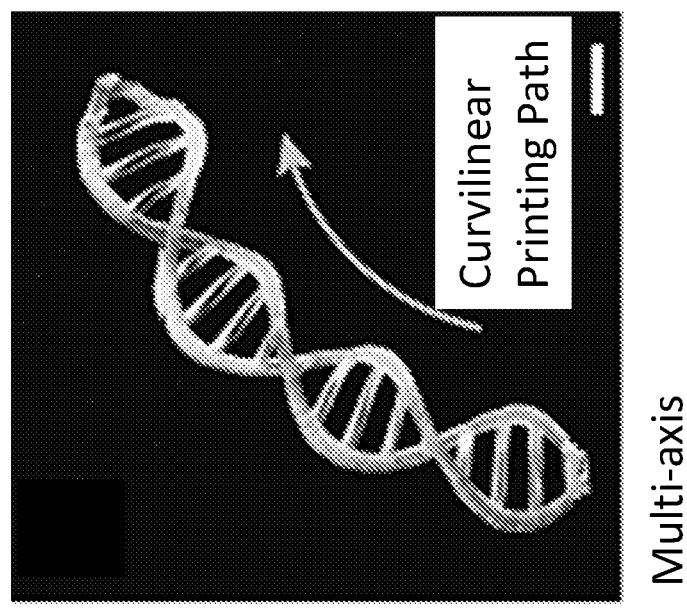
FIG. 1G depicts a full bent double helix structure printed via a 3D curvilinear printing path using a multi-axis printing process in accordance with an illustrative embodiment.
Figure 1J:
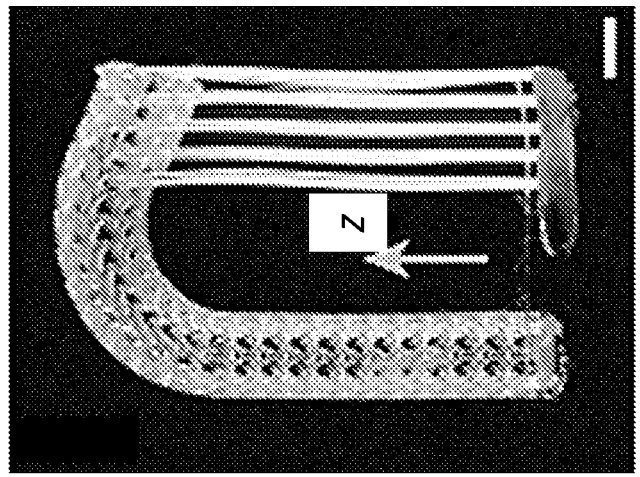
FIG. 1J depicts sacrificial supporting structures used to facilitate printing of the shape of FIG. 1H in accordance with an illustrative embodiment.
Figure 1I:
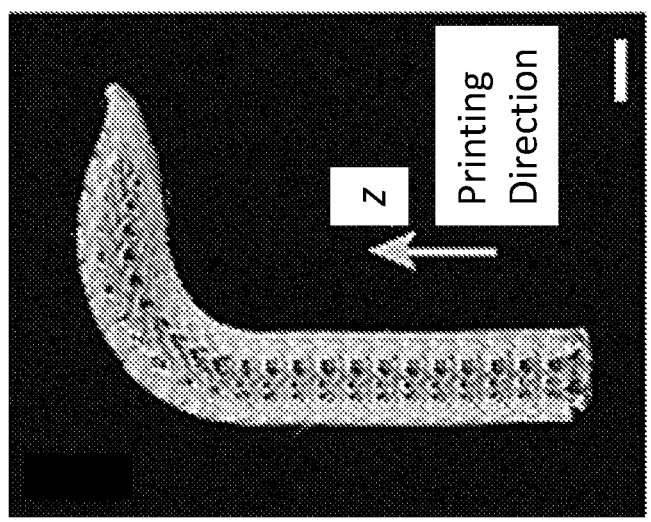
FIG. 1I depicts an attempt to print the shape of FIG. 1H using a conventional unidirectional printing process in accordance with an illustrative embodiment.
Figure 1K:
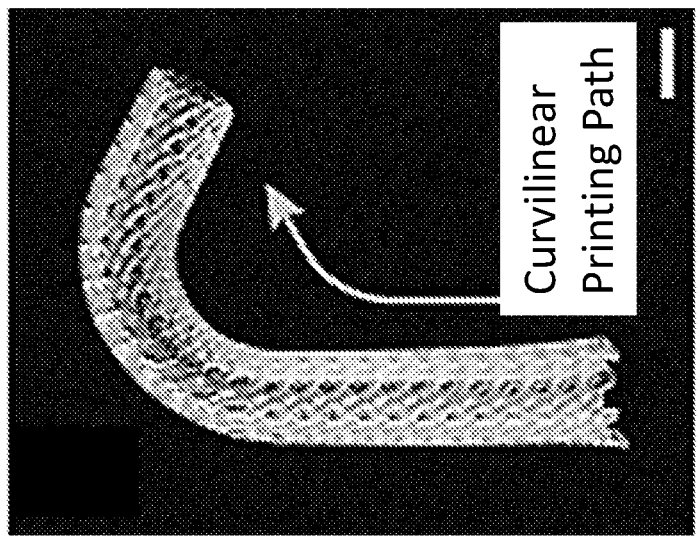
FIG. 1K depicts successful fabrication of the shape in FIG. 1H via a curvilinear printing path that eliminates the need for supporting structures in accordance with an illustrative embodiment.

Alternatively, it is possible to reorient the part to more favorably print along the system printing direction and avoid the downfacing features. However, the presence of multiple downfacing features may represent the conflict in finding the optimal printing direction. In contrast, the proposed multi-axis printing process allows one to locally pivot the printing direction to better mitigate the issue of 3D printing downfacing overhang features. FIG. 1K depicts successful fabrication of the shape in FIG. 1H via a curvilinear printing path that eliminates the need for supporting structures in accordance with an illustrative embodiment. The use of a curvilinear printing path demonstrates the enhanced flexibility, efficiency, and quality of the proposed printing process. It is noted that the scale bars in FIGS. 1F and 1G are 4 mm, and the scale bars in FIGS. 1I-1K are 2 mm.

The proposed system (FF-PµSL) enables higher order transformation of the digital design on-the-fly, through independent 6-DOF manipulation (scaling in x-y-z and rotating in a-b-g) of each discrete build layer towards the final 3D construct without the need for complex mathematics to alter the base digital model. To illustrate this, the inventors used the classic Eiffel tower model. FIG. 2A depicts the classic Eiffel tower model as a representative base design in accordance with in illustrative embodiment. FIG. 2B depicts the Eiffel tower model decomposed into a series of horizontal slicing layers, which can be replicated via 1-DOF stage translation along the z-axis in accordance with an illustrative embodiment. Adding one additional DOF in the stage motion allows one to reconstitute the three primary deformation modes: shear (2-DOF in xz), bend (2-DOF in z-a), and twist (2-DOF in z-g). FIG. 2C depicts the shear deformation mode in accordance with an illustrative embodiment. FIG. 2D depicts the bend deformation mode in accordance with an illustrative embodiment. FIG. 2E depicts the twist deformation mode in accordance with an illustrative embodiment.

Further increasing the DOF of the stage motion allows one to hybrid the primary deformation modes, with some representative examples being illustrated in FIGS. 2F-2I. Specifically, FIG. 2F depicts two-dimensional (2D) shear in accordance with an illustrative embodiment. FIG. 2G depicts 2D bend in accordance with an illustrative embodiment. FIG. 2H depicts one-dimensional (1D) shear and 1D bend in accordance with an illustrative embodiment. FIG. 2I depicts 2D shear and 1D twist in accordance with an illustrative embodiment. In FIG. 2, the arrows represent the activated DOF in translation and rotation, and the scale bars in FIGS. 2B-2I are 2 mm. As expected, the increased degrees of freedom provide convenient access to transform the digital model in real-time, fully eliminating the need for mathematically-intense procedures to alter and re-slice the digital model.

It is noted that the out-of-plane rotation of the slicing planes can result in nonuniform thickness of the building layers. Currently, the rotation angle is restricted to less than 0.04° at a 20 µm slicing layer thickness. Thus, the overlapping curing region has been fully concealed within the newly fabricated layer, without compromising the surface roughness and reducing any mechanical inhomogeneity as much as possible. Additionally, it is possible to implement the grayscale UV exposure to spatially control the curing depth for larger angular manipulation. Through a precise calibration of the speed-working curve model, it is also possible to eliminate the overlapping region to further improve the surface smoothness and internal mechanical homogeneity, as discussed below.

Preserving the locality of the transformation for each build layer during the sequential layered manufacturing process, the inventors further demonstrated the method for conformal transformation among two dissimilar geometries.

Such a transformation is highly sought-after for customizing biomedical devices to fit specifically to each patient's unique anatomy. For example, FIG. 3A shows a reconstructed solid model (STL, stereolithography) of a section of the human thoracic aorta obtained from the magnetic resonance imaging (MRI) in accordance with an illustrative embodiment. The model was obtained through 3D segmentation and subsequent STL conversion of a contrast-enhanced MR angiography data set taken during a standard-of-care cardiothoracic MRI exam. Normally, transformation of the deterministic design geometry of vascular scaffold to the distinct morphology of the implantation site requires a mathematically intense procedure. FIG. 3B depicts a solid model of the deterministic vascular scaffold design in accordance with an illustrative embodiment. FIG. 3C depicts corresponding planar-layer slices in accordance with an illustrative embodiment. Exploiting the ability to implement local transformation of individual build layer using the proposed system, the inventors developed a discrete conformal transformation (DCT) method to transform the deterministic scaffold design (FIGS. 3B, 3C) to match with the inner lumen of the blood vessel (FIG. 3A).

The DCT was accomplished by first establishing the conformal map of the object surface model using a dynamic conformal slicing (DCS) algorithm. In DCS, the surface model is discretized by a series of slicing planes which are additionally constrained to minimize the slicing plane cross-sectional area by varying the angles of the surface normal ($\psi$-f). FIG. 3D depicts the conformal map with conformal slicing to minimize the section area in accordance with an illustrative embodiment. The spline of the conformal map is then defined by sequentially connecting the centroid of each slicing layer and the associated surface normal. FIG. 3E depicts a skeleton formed from a series of sliced layers that have been sequentially attached to the center spline at the centroid points in accordance with an illustrative embodiment. FIG. 3E also shows an inset depicted slice details. Each slicing layer is represented by the local frame (u, v, w) with respect to the reference frame (x, y, z). As shown, the orthogonality among the slicing layers and the spline is preserved from the initial conformal map.

Figure 3H:
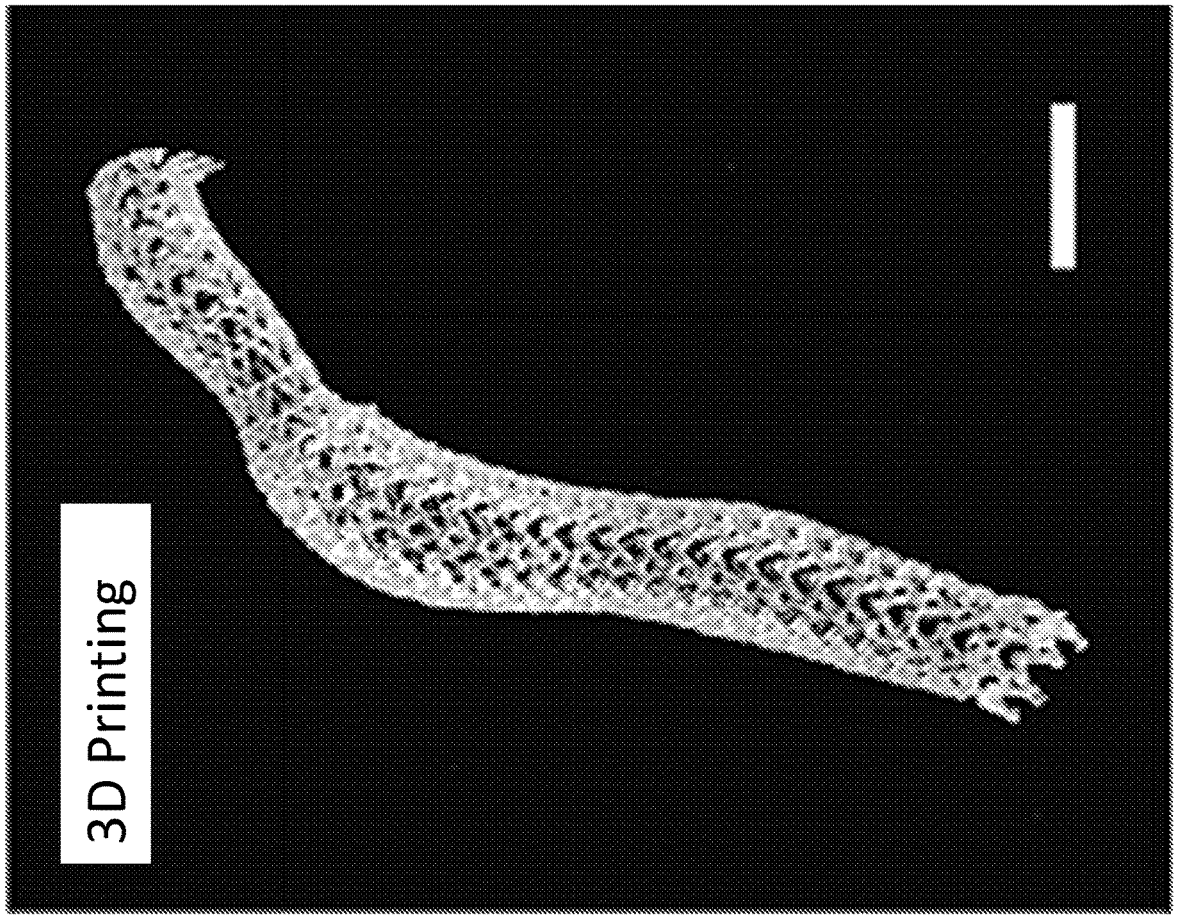
FIG. 3H shows a 3D printed vascular scaffold with customized fit to the intricate vessel of FIG. 3A in accordance with an illustrative embodiment.

FIG. 3F depicts the calculated conformal map of the blood vessel model illustrated in FIG. 3A in accordance with an illustrative embodiment. The spline possesses 3-DOF in w-$\psi$-f, where w represents the slicing layer thickness and $\psi$-f collectively represent the orientation of the surface normal with respect to the reference frame (x, y, z). Each slicing layer is approximated by an elliptical shape, which is represented using a conformation vector (u, v, $\Theta$), where u and v represent the dimension along the two principle axes of the elliptical shape and $\Theta$ represents the in-plane rotation of the principle axis. Collectively, they resemble the 6-DOF of the reference frame (u, v, w). FIG. 3G represents a transformation matrix and shows how discrete layers are approximated by an elliptical shape in accordance with an illustrative embodiment. Since the established conformal map preserves the orthogonality of the slicing layer and the spline, it then becomes possible for one-to-one mapping of the discrete unidirectional slices of the initial scaffold design (FIG. 3C) to the conformal map of the blood vessel. Each of the slicing layers are individually transformed using the associated conformation vector (u, v, $\Theta$), and then sequentially 3D printed using the proposed system. FIG. 3H shows a 3D printed vascular scaffold with customized fit to the intricate vessel of FIG. 3A in accordance with an illustrative embodiment. In FIG. 3H, the scale bar is 5 mm. As shown, the printed scaffold is a much closer approximation to the actual vessel when compared to the traditional tubular mesh design shown in FIG. 3B.

Figure 4B:
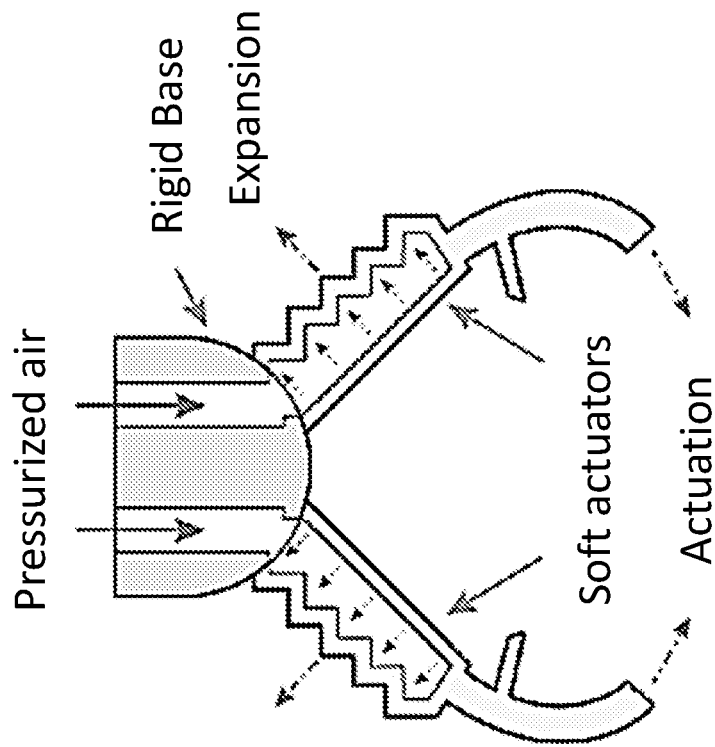
FIG. 4B is a cross-sectional view of the gripper of FIG. 4A in accordance with an illustrative embodiment.
Figure 4A:
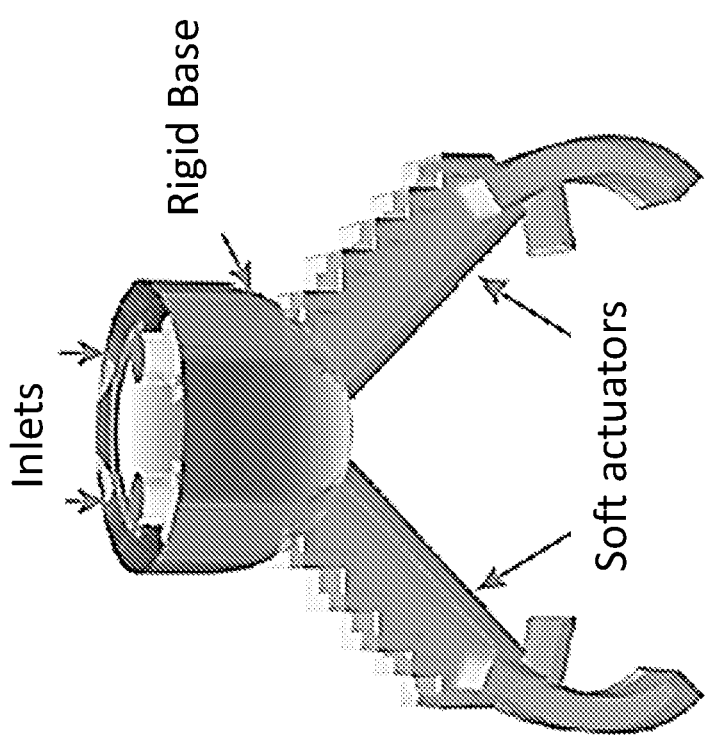
FIG. 4A depicts the design of the gripper with a rigid base and soft actuators in accordance with an illustrative embodiment.

In addition to in-process design customization and conformal geometry fabrication, the proposed system further strengthens the capability for heterogenous integration of multiple functional materials in 3D printed devices. The inventors used the design of a soft pneumatic actuating gripper as an example to illustrate the multi-axis, multi-materials 3D printing process using the proposed FF-P$\mu$SL system. The soft gripper includes a rigid semispherical base to provide structural support of two multi-gait soft actuating limbs being attached along the ±45 degree angle. FIG. 4A depicts the design of the gripper with a rigid base and soft actuators in accordance with an illustrative embodiment. FIG. 4B is a cross-sectional view of the gripper of FIG. 4A in accordance with an illustrative embodiment. The cross-sectional view shown in FIG. 4B highlights the interior air channels connecting the inlet from the rigid base to the hollow chambers inside two soft actuating limbs. The difference in strain between the textured outer layer and flat inner layer causes the multi-gait soft actuating limbs to bend inwards when pressurized. Although 3D printing technologies have been widely used to fabricate robotic actuators, traditional 3D printing processes employing unidirectional motion control are not capable of fabricating the soft gripper design shown in FIG. 4A.

Multi-materials photopolymerization additive manufacturing was generally accomplished by replacing photocurable resins through bath switching or through the use of pumps, blades, or even manual input. In particular, the top-down stereolithography process was shown to have a very interesting and advantageous capability for multi-materials fabrication, as the resin surface remains to be unconstrained. It allows whole and partial cross-sectional volumes of the work piece to be fabricated as independent stages with a given intended material. On the other hand, while bottom up stereolithography processes, such as CLIP and HARP, improved the printing speed against top-down approach, the presence of oxygen permeable membrane unfavorably obstructs the fabricated structure from protruding through the resin surface. Thus, the multi-materials printing strategy developed for the top-down approach no longer is applicable for the bottom-up process. Multiple resin baths for typical bottom-u" stereolithography can only be conducive to timely multi-materials fabrication if whole cross-sectional layers are printed per material. Thus, fabricating certain devices involves printing multiple materials within a given cross-section. Changing material baths can be counterproductive for complex parts, as the bath change would need to occur multiple times within a single layer printing. To mitigate the abovementioned issue, the inventors developed the modular 3D printing strategy described herein. This strategy allows one to divide the solid model into a series of structural modules, which can be printed sequentially via the distinct printing path being optimized specifically for of each module.

It is worthwhile to note that the modular 3D printing strategy further provides the freedom to minimizing the overlap of multiple materials within the same printing layer and thus, enhances the efficiency and quality for multi-material 3D printing process. One representative multi-materials design, described in more detail below, includes seven distinct regions constituting different materials. Using the conventional planar slicing method, the representative slicing layers indicate the presence of multiple materials within the same slicing layer. Thus, it can be extremely time-consuming to switch printing materials for every single slicing layer using traditional techniques. In contrast, by implementing the modular 3D printing strategy, one can minimize the overlapping of the multi-materials in the same printing layer. As a result, the fabricated structure only involved switching of the materials six times, which is significantly faster than the traditional unidirectional printing process that may require the switching of materials one hundred times or more to fabricate the same structure.

Figure 4E:
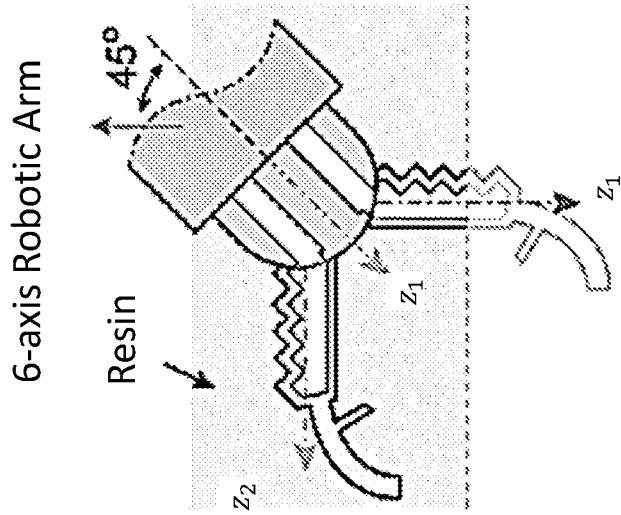
FIG. 4E depicts printing of the right side soft pneumatic actuator in the $z_3$ direction in accordance with an illustrative embodiment.
Figure 4D:
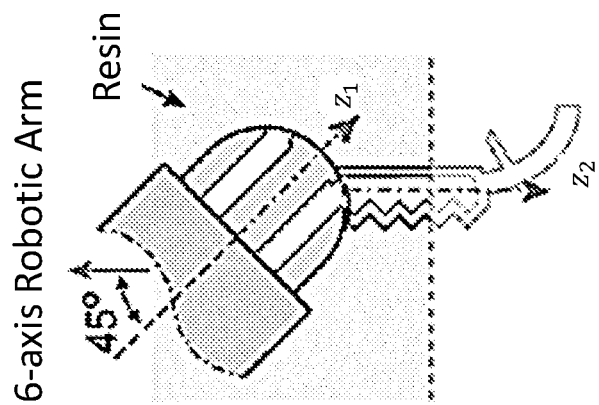
FIG. 4D depicts printing of the left side soft pneumatic actuator in the $z_2$ direction in accordance with an illustrative embodiment.
Figure 4C:
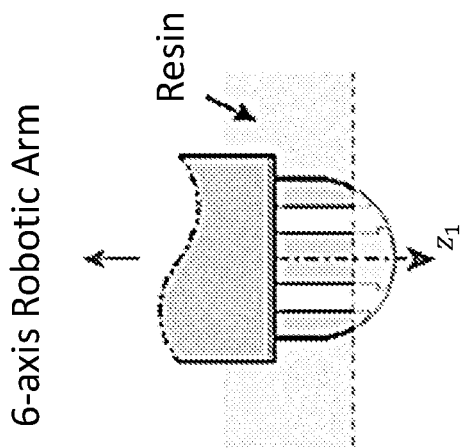
FIG. 4C depicts 3D printing of the rigid base of the gripper along direction $z_1$ in accordance with an illustrative embodiment.

The inventors demonstrated multi-axis 3D printing of the soft gripper via heterogenous integration of soft and rigid materials using the proposed system. FIG. 4C depicts 3D printing of the rigid base of the gripper along direction $z_1$ in accordance with an illustrative embodiment. FIG. 4D depicts printing of the left side soft pneumatic actuator in the $z_2$ direction in accordance with an illustrative embodiment. FIG. 4E depicts printing of the right side soft pneumatic actuator in the $z_3$ direction in accordance with an illustrative embodiment. As shown in FIG. 4C, the rigid base with built-in air channels was first 3D printed along the vertical direction ($z_1$-axis) using a stiff resin with high crosslinking density (Young's modulus E=3.36 MegaPascals (MPa)). The robotic arm then moves the fabricated rigid base into the solvent bath, which acts to minimize resin-to-resin cross-contamination in the subsequent printing operations. The robotic arm then rotates the base to a ±45 degree angle, allowing sequential addition of the two soft actuating limbs along the inclined $z_2$- and $z_3$-axes, respectively (FIGS. 4D and 4E). The soft limbs were fabricated using soft resin with low crosslinking density (Young's modulus E=0.16 MPa).

Figures 4F, 4G, 4H:
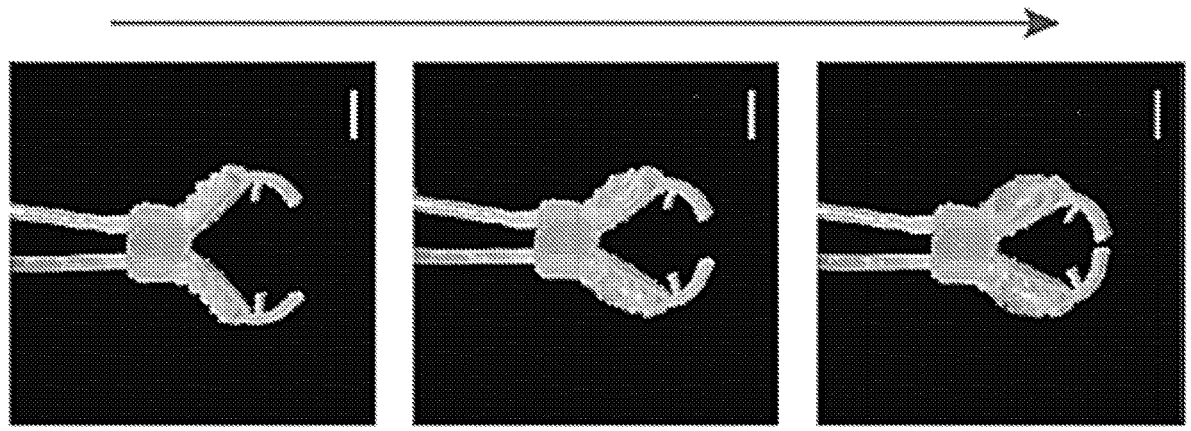
FIG. 4F depicts the fabricated pneumatic gripper with pneumatic actuation using pressurized air to manifest gripping motion in accordance with an illustrative embodiment.
FIG. 4G depicts gripping action in a first position in accordance with an illustrative embodiment.
FIG. 4H depicts gripping action of the printed gripper in a second position in accordance with an illustrative embodiment.
Figure 4I:
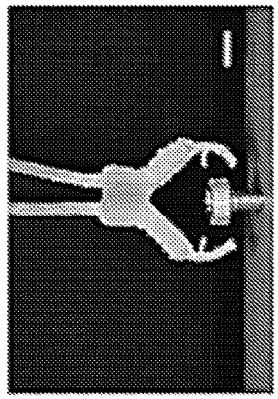
FIG. 4I depicts the printed soft gripper engaging the machine screw to be lifted in accordance with an illustrative embodiment.
Figure 4J:
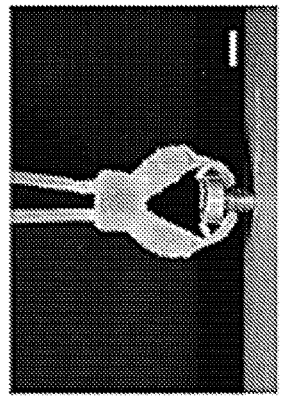
FIG. 4J depicts the printed soft gripper closing around the machine screw in accordance with an illustrative embodiment.
Figure 4K:
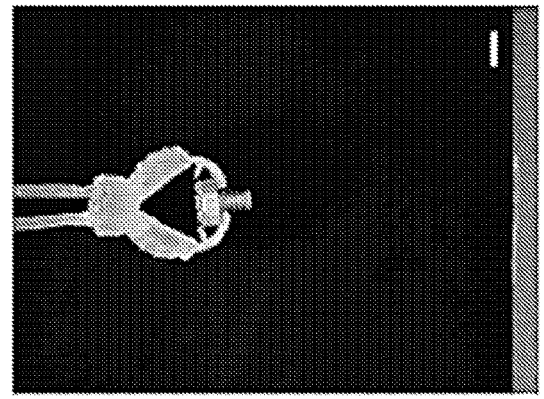
FIG. 4K depicts the printed soft gripper lifting the machine screw in accordance with an illustrative embodiment.

Two plastic tubes were attached to the inlets of the 3D printed soft gripper for supplying pressurized air. FIG. 4F depicts the fabricated pneumatic gripper with pneumatic actuation using pressurized air to manifest gripping motion in accordance with an illustrative embodiment. Simply pressurizing air using a syringe inflates the hollow chamber inside the two soft limbs, causing them to bend inwards and thus accomplishing the intended gripping motion. FIG. 4G depicts gripping action in a first position in accordance with an illustrative embodiment. FIG. 4H depicts gripping action of the printed gripper in a second position in accordance with an illustrative embodiment. The printed gripper was further actuated to lift a small aluminum machine screw (Mass=0.82 grams (g), head diameter=6.7 mm) from the tabletop. FIG. 4I depicts the printed soft gripper engaging the machine screw to be lifted in accordance with an illustrative embodiment. FIG. 4J depicts the printed soft gripper closing around the machine screw in accordance with an illustrative embodiment. FIG. 4K depicts the printed soft gripper lifting the machine screw in accordance with an illustrative embodiment. The scale bars in FIG. 4 are 5 mm.

Thus, it has been shown herein that untethering the build layer fabrication from unidirectional stage motion unlocks the ability to reconstitute 3D objects with added manufacturability such as custom design transformations, conformal geometry, and multi-material integration. The newfound fabrication flexibility allows one to digitally transform the 3D printed parts on-the-fly, to print conformal geometry to ensure custom fitting of vascular scaffolds, to realize multi-axis, multi-materials 3D printing of soft robotic actuators, etc. The manufacturability of the proposed system is further augmented with the use of a high-precision 6-axis robotic arm. This allows the system to perform manufacturing tasks other than 3D printing, such as rinsing the samples during a printing process. Additionally, the full 360-degree rotational DOF in its 6th joint makes it readily compatible with the volumetric CAL 3D printing processes. Finally, although the reported method primarily focuses on the continuous stereolithography process, the underlying principle can be applied to other 3D printing processes, with the potential to ease the burden towards the envisioned multi-process 3D printing.

Included below is a more detailed discussion of the materials and methods used, the printing procedure, post processing, and 3D object design, and the algorithms used. The materials used in the aforementioned experiments are formulated from commercially available photopolymers, photoinitiators, and UV absorbers. Photopolymers were obtained from Sigma-Aldrich. The photoinitiator was obtained from BASF and UV absorbers were obtained from Sigma-Aldrich. The HDDA resin used in FIG. 1 and FIG. 2 was composed of 1,6-hexanediol diacrylate (HDDA; CAS: 13048-33-4) with the concentration of 97.3 wt. %, Phenylbis (2,4,6-trimethylbenzoyl) phosphine oxide (Irgcure 819, BAPO-type photoinitiator CAS: 162881-26-7) by 2.2 wt. % as the photoinitiator, and a photo-absorber of 2-(2H-Benzotriazol-2-yl)-6-dodecyl-4-methylphenol (Tinuvin171, CAS: 125304-04-3) by 0.5 wt. %. In alternative embodiments, different materials and/or concentrations may be used.

The "soft resin" for the actuating gripper used in FIG. 4 was composed of 2-Hydroxyethyl methacrylate (HEMA, CAS: 868-77-9) at the concentration of 99 wt. % and Irgcure 819 at the concentration of 1 wt. %. The "rigid resin" for the actuating gripper used in FIG. 4 was composed of 2-Hydroxyethyl methacrylate (HEMA, CAS: 868-77-9) by 94 wt. %, ethylene glycol dimethacry (EGDMA, CAS: 97-90-5) at the concentration of 5 wt. %, and the photoinitiator of Irgcure 819 by the concentration of 1 wt. %. In alternative embodiments, different materials and/or concentrations may be used.

Figure 5B:
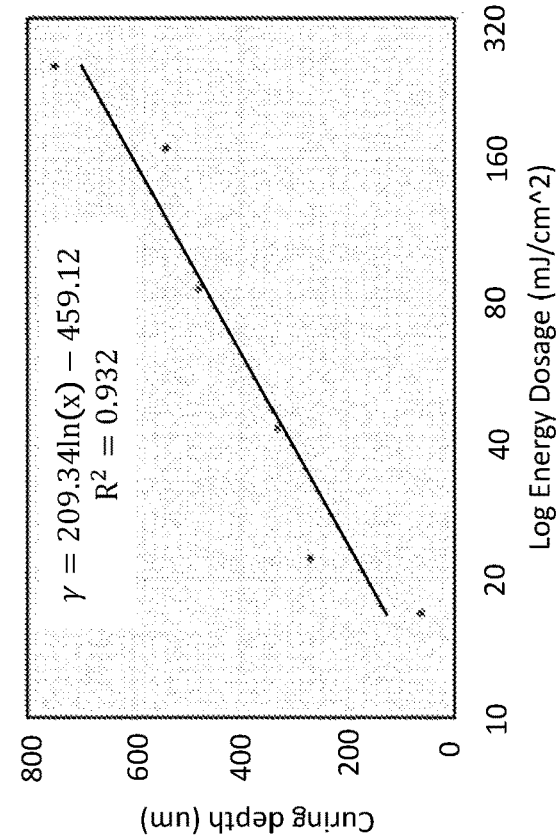
FIG. 5B shows the curing depth for a resin with 99 wt % HEMA+1 wt % Irgcure 819 in accordance with an illustrative embodiment.
Figure 5A:
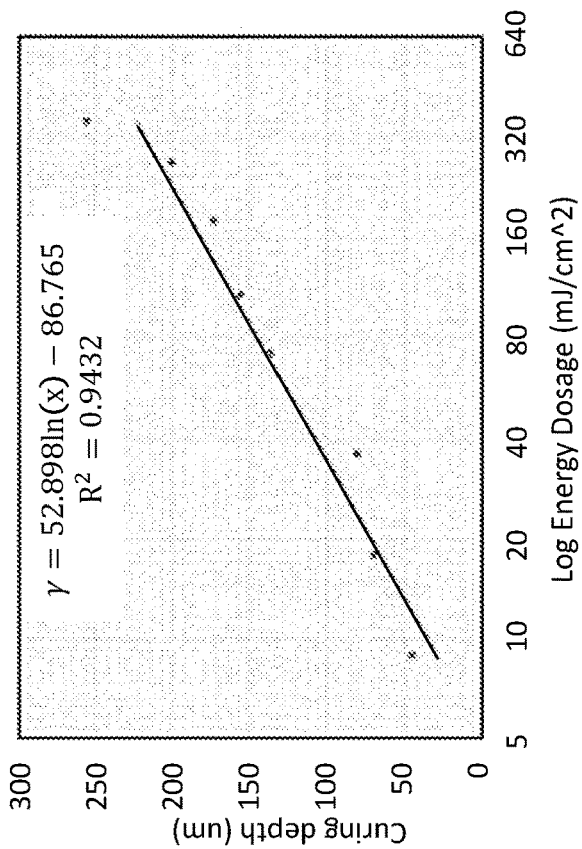
FIG. 5A shows the curing depth for a resin with 97.3 wt % HDDA+2.2 wt % Irgcure 819+0.5 wt % Tinuvin171 in accordance with an illustrative embodiment.
Figure 5C:
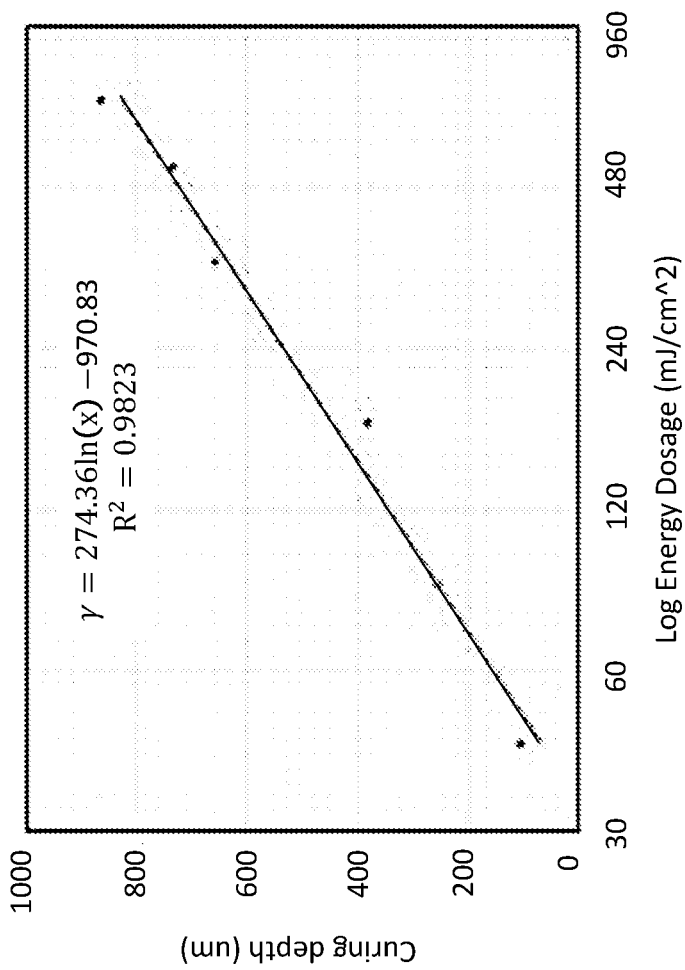
FIG. 5C shows the curing depth for a resin with 94 wt % HEMA+5 wt % EGDMA+1 wt % Irgcure 819 in accordance with an illustrative embodiment.

FIGS. 5A-5C depict the curing depth of photocurable resin as a function of UV energy flux. The curing depth was characterized by measuring the thickness of suspend beams. FIG. 5A shows the curing depth for a resin with 97.3 wt % HDDA+2.2 wt % Irgcure 819+0.5 wt % Tinuvin171 in accordance with an illustrative embodiment. FIG. 5B shows the curing depth for a resin with 99 wt % HEMA+1 wt % Irgcure 819 in accordance with an illustrative embodiment. FIG. 5C shows the curing depth for a resin with 94 wt % HEMA+5 wt % EGDMA+1 wt % Irgcure 819 in accordance with an illustrative embodiment.

The physical system used to perform the 3D printing included an optical engine (Pro6600, wavelength: 385 nm), which was purchased from Wintech Digital Systems Technology Corp, a 6-axis robot arm purchased from Mecademic, a motorized stage for switching materials, and optical components. In alternative embodiments, different types of components may be used. The system can also include a computing system that has a processor, memory, transceiver, interface, etc. The memory can be used to store a DCS algorithm that produces the fabrication information and a control software to calculate, transform, and distribute the data. Specifically, the information of sliced contours (bitmaps) can be sent to the light engine layer by layer during the printing process. The position and orientation data are calculated and transformed according to the robot arm reference frame system. The robot arm is able to perform 6-DOF printing according to the movement and rotation commands, which can be controlled by the processor. With the addition of a motorized stage to the resin vat, multiple materials can be easily switched to make for quick transition between single-print jobs and multi-material print jobs.

Figure 6:
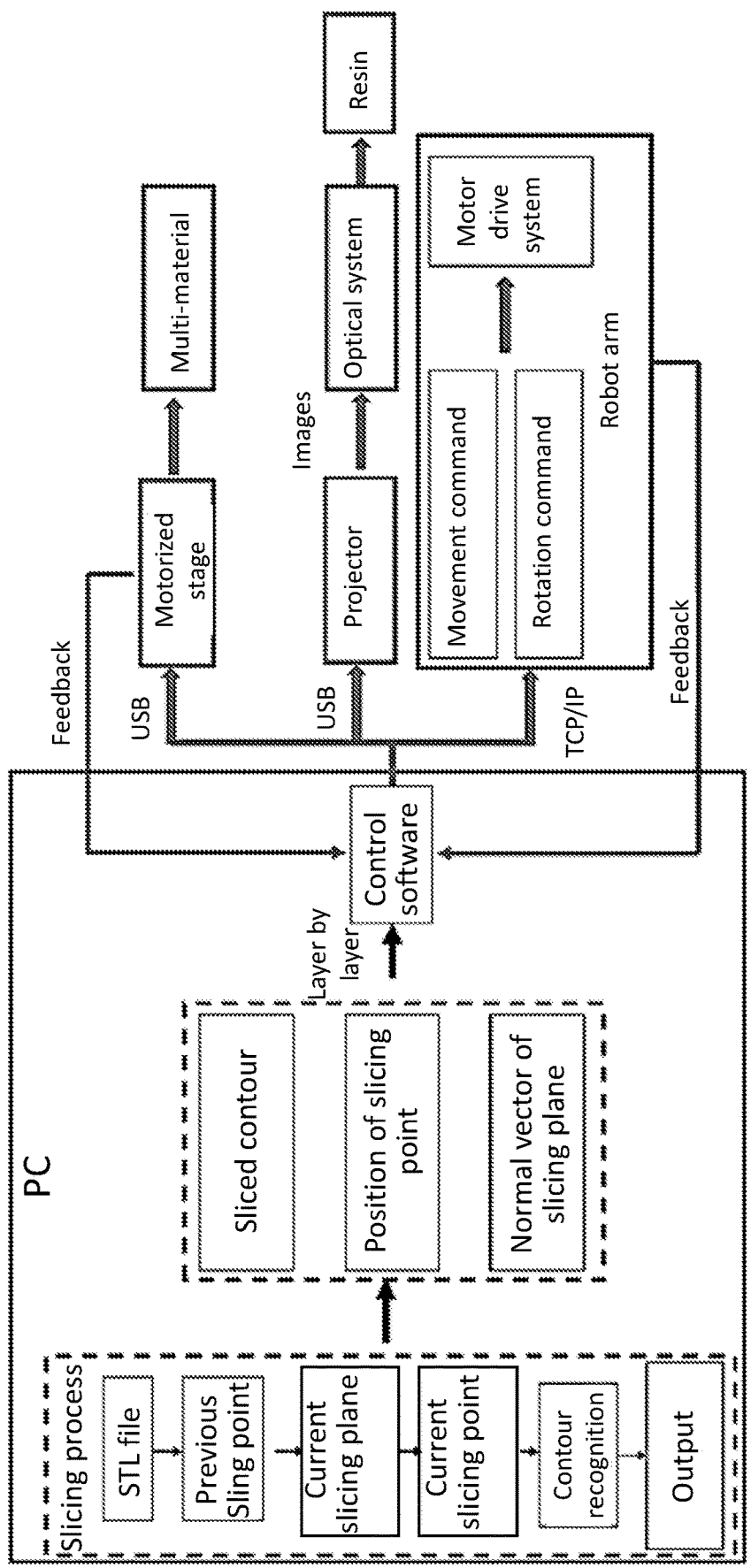
FIG. 6 depicts the working principle of the proposed system in accordance with an illustrative embodiment.

FIG. 6 depicts the working principle of the proposed system in accordance with an illustrative embodiment. By slicing 3D models with DCS, the 2D sliced contour, position of slicing point, and normal direction of each layer are available. The control software is developed to send the sliced contours (e.g., bitmaps) to the light engine layer by layer during printing, transform the position and orientation of each layer according to the robot arm reference frame system, send the transformed movement and rotation commands to 6-DOF robot arm, control the motorized stage to switch different materials for building multi-material objects, and receive the feedback from the robot arm and the motorized stage.

Figure 7:
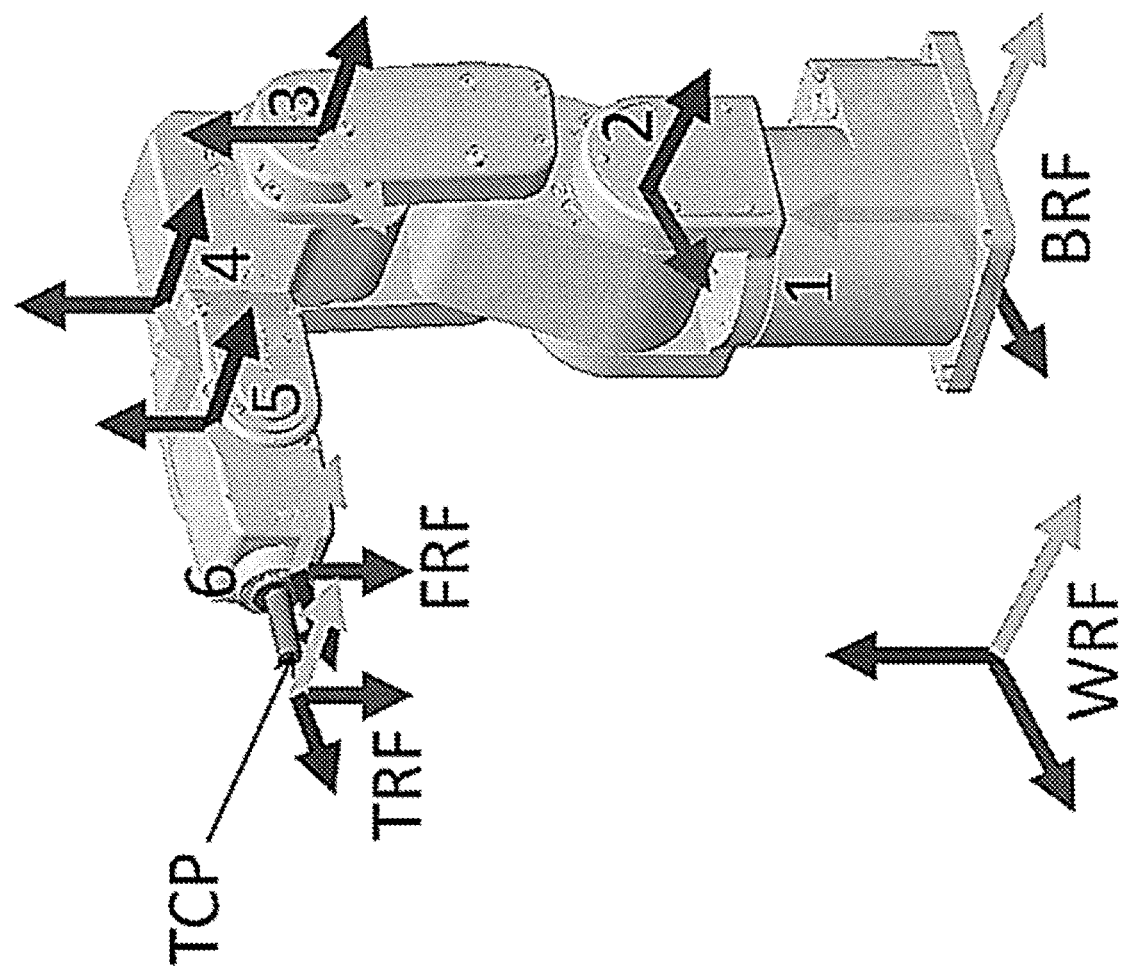
FIG. 7 depicts a 6-degree of freedom robot arm in accordance with an illustrative embodiment.

The robot arm can be composed of six joints, and for each joint, a reference frame is set up. The base reference frame (BRF) is a static reference frame fixed to the robot base, which coincides with the world reference frame (WRF) by default. The flange reference frame (FRF) is a mobile reference frame fixed to the robot flange (mechanical interface). The tool reference frame (TRF) is the robot end-effector's reference frame and it coincides with the FRF in the proposed system. All the reference frames used in this robot arm are right-handed Cartesian coordinate systems. In alternative embodiments, different reference frames and/or coordinate systems may be used. The robot arm has a repeatability of 0.005 mm and the path accuracy is better than 0.1 mm. FIG. 7 depicts a 6-degree of freedom robot arm in accordance with an illustrative embodiment. The x axes are in red, the y axes are in green, and the z axes are in blue. The robot arm is composed of six joints. For each joint, a reference frame is set up. The joint angle $\theta_i$ associated with joint i (i=1, 2, ... 6) is measured about the z axis associated with the given joint using the right-hand rule. The mechanical limits of the first five robot joints are as follows: (1) $-175° \leq \theta_1 \leq 175°$; (2) $-70° \leq \theta_2 \leq 90$; (3) $-135° \leq \theta_3 \leq 70$; (4) $-170° \leq \theta_4 \leq 170°$; (5) $-115° \leq \theta_5 \leq 115°$. Joint 6 has no mechanical limits. In alternative embodiments, different mechanical limits may be used.

In the conducted experiments, all the models were sliced with the layer thickness of 0.02 mm. All models were printed at room temperature with ambient air pressure. For HDDA parts, a power intensity of 7.9 milliwatts per square centimeter (mW/cm$^2$) was used. An exposure time of 10 s was used to ensure top platform adhesion for the first 5 layers and 1 s of exposure time was used for the rest of the print job. To print the base of the actuating gripper, a power intensity of about 1.5 mW/cm$^2$ was used and the exposure time of 10 s was used for each layer. A relatively low power intensity of 1.0 mW/cm$^2$ and the exposure time of 11.5 s were adopted for each layer to print the actuating gripper limbs. In alternative embodiments, different exposure times may be used.

After the prints were finished, the final parts fabricated with HDDA were washed in 70 wt. % isopropyl alcohol (IPA, CAS: 67-63-0) and 30 wt. % deionized water to remove the unsolidified resin. Then the HDDA parts were placed in water for post-curing with a UV flood exposure system (Inpro F3005) for 2 minutes (46). The parts fabricated with HEMA were cleaned with dibasic ester (DBE) for about 2 minutes.

Before pressurization, the actuator in FIG. 4 was soaked in water for 2 hours at room temperature. After the soaking period, the part was removed and surface level water was wiped away. A syringe connected to the actuating gripper via tubes attached to each actuator inlet was used to manually pressurize the device. Manually pressurizing the syringe would in turn increase the pressure within the limbs and actuate the device. All results shown in FIG. 4 were obtained within 30 minutes after the actuator was removed from the water. The dimension of the actuator model is described in more detail below. FIG. 8 depicts the design dimensions of the actuator (in millimeters) in accordance with an illustrative embodiment. FIG. 8 includes a top view and a cross-sectional view of the actuator.

To realize the free form printing, the inventors developed a dynamic conformal slicing (DCS) algorithm with high efficiency and precision that can also be applied to other multi-DOF AM systems. The proposed DCS algorithm is fundamentally different from the existing multi-directional slicing algorithms. DCS operates within the 3D geometry Cartesian coordinate system from the imported standard stereolithography file format (.stl). As an example, a bending pipe model was used to demonstrate the strategy of DCS. Differing from the traditional slicing algorithm, which slices the 3D geometry with a series of uniform direction slicing planes, the slicing planes in DCS are designed with variable normal vectors. Thus, the computation for the position and direction of each slicing plane is the core process of DCS algorithm. Since the 3D geometry is always sliced from the plane of Z=0, this plane (Z=0) was set as the initial slicing plane. The centroid point of the cross-section of 3D geometry on the initial slicing plane is defined as the initial slicing point.

To compute and output the position and direction of following slicing planes, the thickness, which can be user-defined, was defined as the distance between two adjacent slicing points. The slicing point for each layer is the centroid point of each sliced contour. The current slicing plane is determined based on the previous slicing point, previous slicing plane, and the thickness. The spherical space searching method was used to obtain the current slicing plane. A sphere was established with the center (point O) of a previously established slicing point and the radius of user-defined thickness. A point of $A_0$ on surface of the sphere was first created, while Plane $P_0$ was created with the normal vector of $OA_0$. Point A was then translated on the surface of the sphere along four directions (X+, X−, Y+ and Y−) with a small angle ($\tau$). Thus, a set of points (Set A={Ai}; i=0, 1, 2 . . . ) is generated and a plane $P_i$ vertical to $OA_i$ is created for each point $A_i$ in Set A. From this movement, four new planes were obtained, and one of these five candidates (P0~P4) is selected according to the rule of maximum average included angle (AIA). Additionally, the initial $OA_0$ vector follows the normal direction of the previous slicing plane, while $OA_i$ (i≥1) is not perpendicular to the previous slicing plane as point $A_i$ moves. Further, the same movement from the chosen plane as well as the corresponding point ($A_i$) is conducted, and the same selection is made among the updated five candidates. This process of movement-selection can be executed repeatedly until the optimal candidate is reached according to AIA.

For each selection process, the plane that leads to the maximum AIA was selected, and the following formula was used to define the AIA:

$$\rho_k = \frac{\sum_{i=1}^{i=n} \theta_{ik} \ell_{ik}}{\sum_{i=1}^{i=n} \ell_{ik}}, \qquad \text{Eq. 1}$$

where $\theta_{ik}$, $l_{ik}$ are, respectively, the included angle and intersection line between the triangle i on the surface of 3D geometry and the candidate slicing plane k. The variable ρk represents the AIA of the plane k. From equation 1, the maximum AIA is always equal to 90° or within a small differential since the maximum included angle is 90°. For each current layer, the optimal candidate plane that was selected as the current slicing plane is perpendicular or nearly perpendicular to the 3D geometry, which also indicates that the area of the part profile sliced from the slicing plane is the smallest section. Once the current slicing plane is obtained, the current slicing point can be calculated by recognizing the intersection of current slicing plane and 3D geometry. Using this iterative computation, DCS allows the ability to slice 3D geometries by a series of slicing planes in various normal directions, rather than just the traditional single axis.

Figure 9:
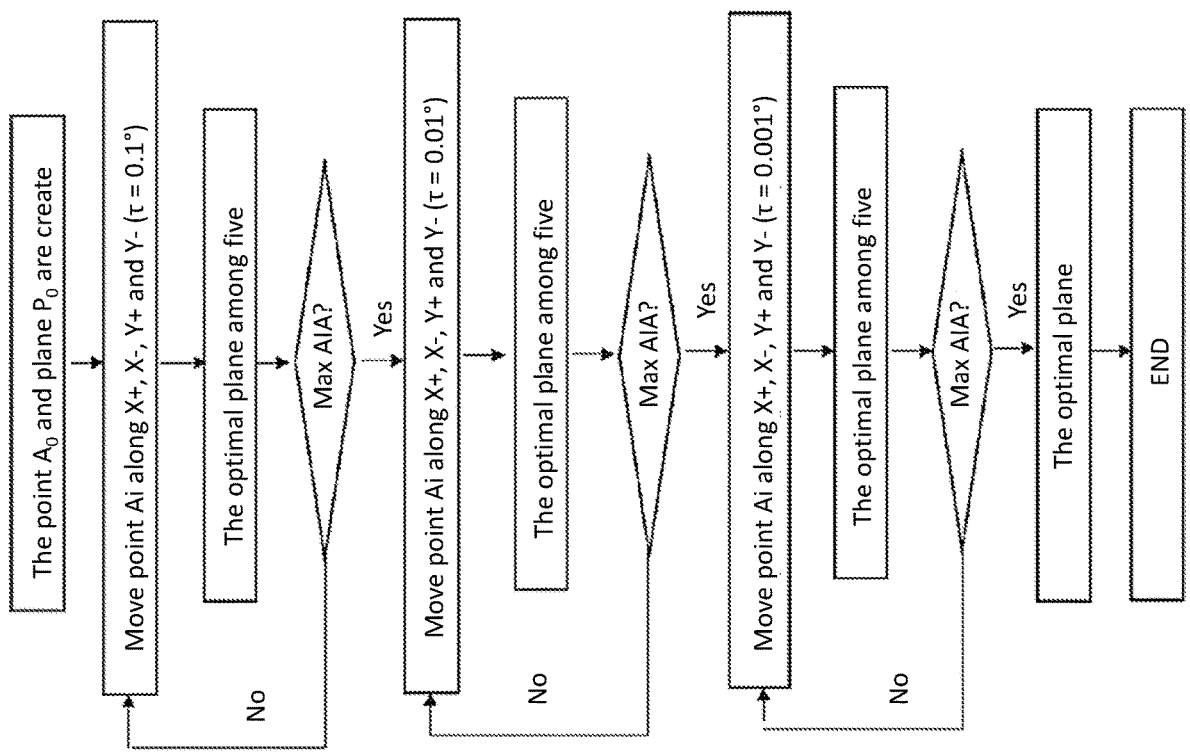
FIG. 9 depicts the searching process for optimal slicing plane of each layer in accordance with an illustrative embodiment.

FIG. 9 depicts the searching process for optimal slicing plane of each layer in accordance with an illustrative embodiment. In alternative embodiments, fewer, additional, and/or different operations may be performed. Also, the use of a flow diagram is not meant to be limiting with respect to the order of operations performed. To improve the searching efficiency as well as the accuracy, the inventors successively used step angles of 0.1 degree and 0.01 degree to locate and narrow the searching range of the optimal slicing plane. A search is then conducted for the optimal slicing plane with the step angle of 0.001 degree. It can be shown that the error of this searching strategy is less than 0.001 degree.

The searching algorithm can be further elucidated in eight operations as follows: 1. A sphere is set up according to the previous slicing point and user-defined thickness, and point $A_0$ and plane $P_0$ are created; 2. Four planes $P_1$, $P_2$, $P_3$ and $P_4$ are created by moving point $A_0$ along X+, X−, Y+ and Y− with $\tau=0.1°$ on the surface of sphere, respectively. Then the local optimal plane which leads to the maximum AIA among the five candidate planes of $P_0$~$P_4$ is chosen for the following operations; 3. The local optimal plane is renewed by moving the local optimal point along X+, X−, Y+ and Y− with $\tau=0.1°$ respectively, such that four planes are generated. A new local optimal plane is obtained by choosing the plane with maximum AIA among these five planes. The local optimal plane will continue to be renewed until the global optimal plane at $\tau=0.1°$ is achieved. Otherwise, the system proceeds to the operation 4 if the local optimal plane is the global optimal plane at $\tau=0.1°$ (P', the corresponding point: A'); 4. Move A' along X+, X−, Y+ and Y− with $\tau=0.01°$ respectively, such that four planes are created, and the local optimal plane among these five planes is selected; 5. Renew the local optimal plane until the global optimal plane at $\tau=0.01°$ is achieved. Otherwise, the system proceeds to the operation (6) if the local optimal plane is the global optimal plane at $\tau=0.01°$ (P'', the corresponding point: A''); 6. Move A'' along X+, X−, Y+ and Y− with $\tau=0.001°$ respectively, such that four planes are created, and the system selects the local optimal plane among these five planes; 7. Renew the local optimal plane until the global optimal plane at $\tau=0.001°$ is achieved. Otherwise, go to the operation (8) if the local optimal plane is the global optimal plane at $\tau=0.001°$ (P''', the corresponding point: A'''); 8. The plane P' is the optimal slicing plane and the searching algorithm ends.

Figure 10A:
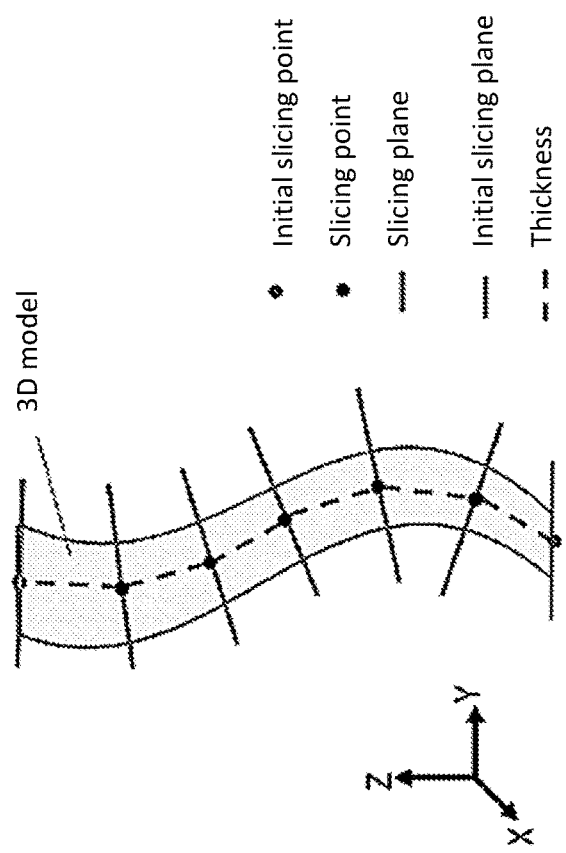
FIG. 10A depicts how the DCS algorithm enables a method that creates discrete layers with the freedom to adjust the direction of surface normal for each individual slicing layer in accordance with an illustrative embodiment.
Figure 10B:
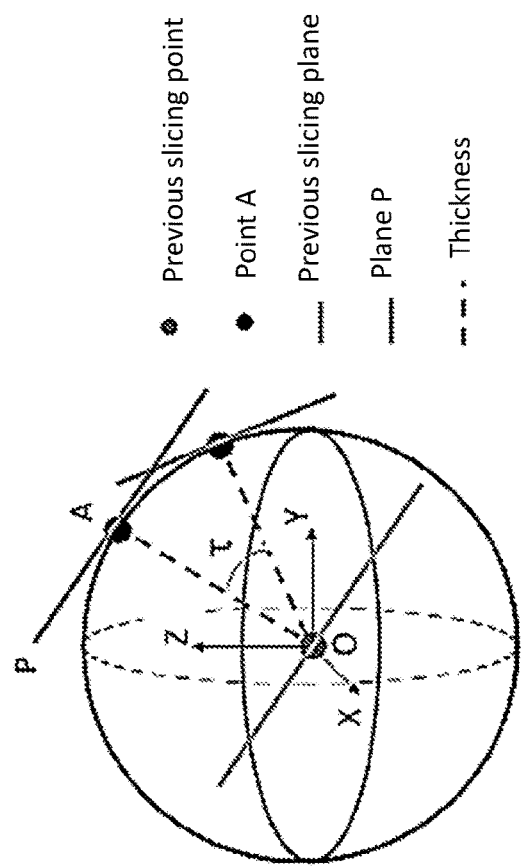
FIG. 10B depicts the searching strategy for the optimal slicing plane of each layer in accordance with an illustrative embodiment.
Figure 10C:
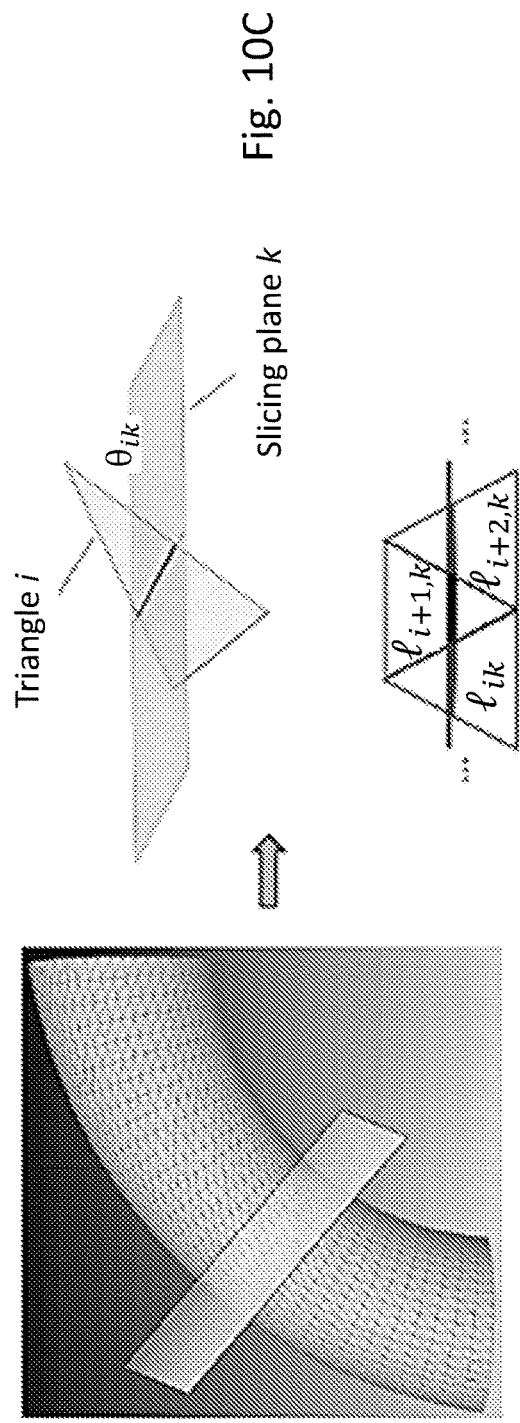
FIG. 10C depicts the definition of AIA in accordance with an illustrative embodiment.
Figure 10D:
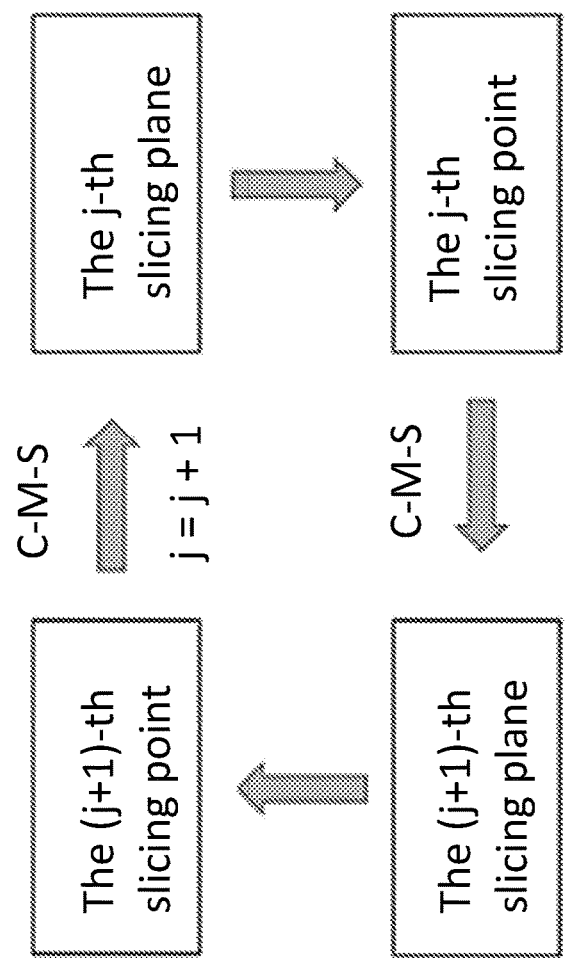
FIG. 10D shows the iterative process of the DCS in accordance with an illustrative embodiment.
Figure 10E:
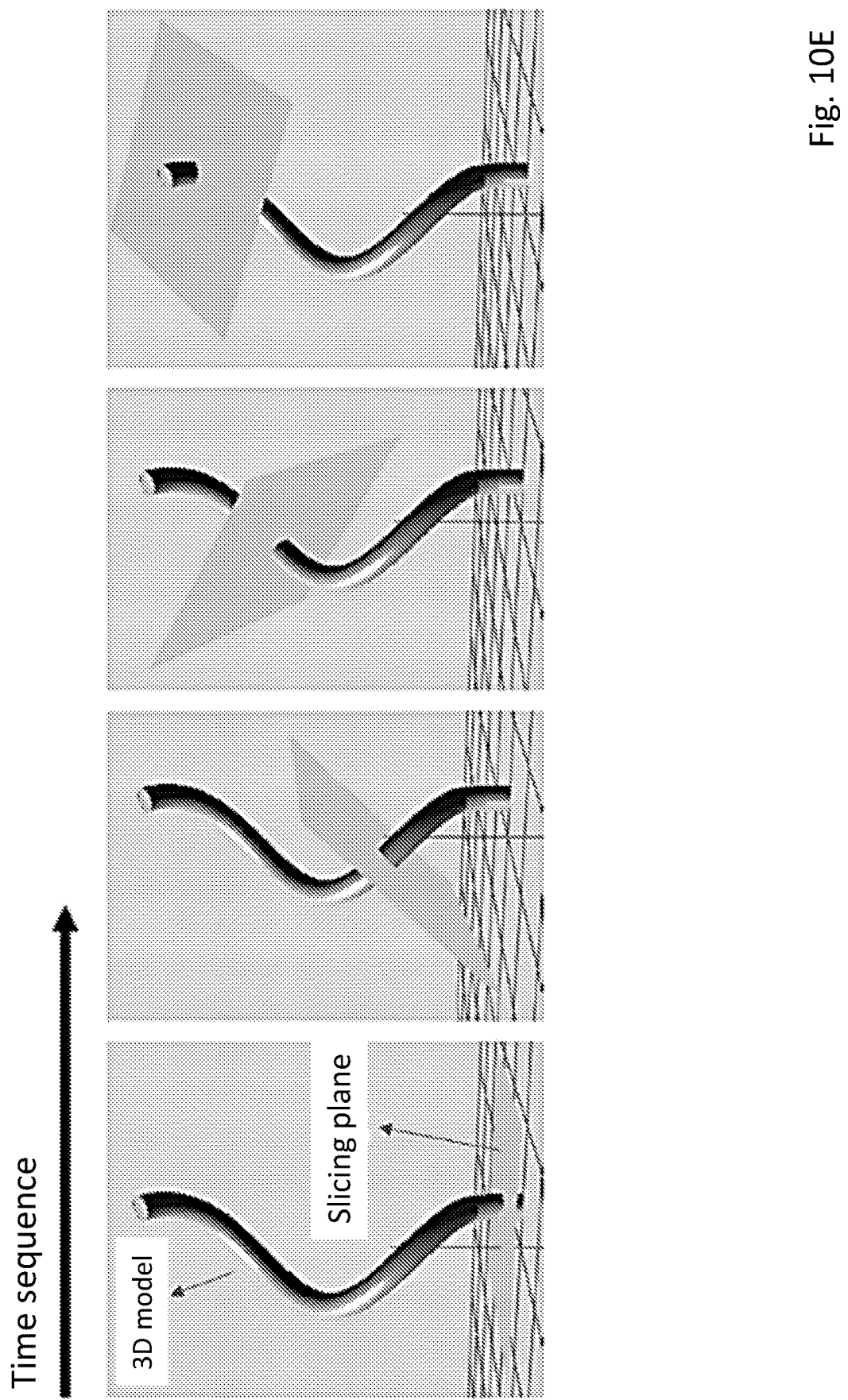
FIG. 10E depicts an example of slicing with DCS in accordance with an illustrative embodiment.

FIGS. 10A-10E illustrate the DCS algorithm. Specifically, FIG. 10A depicts how the DCS algorithm enables a method that creates discrete layers with the freedom to adjust the direction of surface normal for each individual slicing layer in accordance with an illustrative embodiment. FIG. 10B depicts the searching strategy for the optimal slicing plane of each layer in accordance with an illustrative embodiment. FIG. 10C depicts the definition of AIA in accordance with an illustrative embodiment. FIG. 10D shows the iterative process of the DCS in accordance with an illustrative embodiment. The expression C-M-S represents the process of creating an initial point $A_0$ and a plane $P_0$, then moving $A_0$ to obtain four more candidate slicing planes, and finally selecting the optimal slicing plane. FIG. 10E depicts an example of slicing with DCS in accordance with an illustrative embodiment.

To improve the searching efficiency and avoid the disturbance solutions, the movement range of $A_i$ from point $A_0$ is limited to within 30° ($\angle A_i OA_0 \leq 30°$). The first slicing plane is determined with the same searching process while the center of sphere is the initial slicing point. Furthermore, the slicing (centroid) point for each layer can be calculated with equation 2, as follows:

$$L = \frac{\sum_{i=1}^{N} M_i}{N}, \qquad \text{Eq. 2}$$

where L is the coordinate of slicing point, M represents the coordinate for the pixel point of the sliced contour, and N is the number of pixels.

Due to the multi-directional slicing, each layer leads to different normal direction. However, for non-supporting fabrication, the sliced contour of each layer should be transformed along the "build-up" direction. Specifically, each sliced layer should be translated to the location of the print receiving platform and rotated to be perpendicular to the printing plane. The coordinate transformation for each sliced contour is realized by equation 3, as follows:

$$C_{tr} = RTC, \qquad \text{Eq. 3:}$$

where R is a rotation matrix, T is a translation matrix, C is the coordinate matrix of sliced contour, and $C_{tr}$ is the transformed coordinate matrix. The translation matrix (T) is given by equation 4, as follows:

$$T = \begin{bmatrix} 1 & 0 & 0 & \Delta x \\ 0 & 1 & 0 & \Delta y \\ 0 & 0 & 1 & \Delta z \\ 0 & 0 & 0 & 1 \end{bmatrix}, \qquad \text{Eq. 4}$$

where $\Delta x$, $\Delta y$, and $\Delta z$ are calculated as follows:

$$\begin{cases} \Delta x = x_0 - x_k \\ \Delta y = y_0 - y_k, \\ \Delta z = z_0 - z_k \end{cases} \qquad \text{Eq. 5}$$

where ($x_0$, $y_0$, $z_0$) is the coordinate of the reference point, which is the origin point in this case, in a workpiece coordinate system. The point ($x_k$, $y_k$, $z_k$) is the coordinate of reference point on the slicing plane. Typically, this point is the slicing point of each layer and k is the layer number (1≤k≤maxNums).

To rotate the slicing plane, the rotation axis and rotation angle are solved. Generally, the printing direction of an AM system is designed as the Z+ direction. The rotation angle (ε) and axis can be determined as follows:

$$\varepsilon = \arccos\ (Vx_k, Vy_k, Vz_k) \cdot (0,0,1) \qquad \text{Eq. 6:}$$

$$(U, V, W) = (Vx_k, Vy_k, Vz_k) \times (0,0,1), \qquad \text{Eq. 7:}$$

where ($Vx_k$, $Vy_k$, $Vz_k$) is the normal vector of slicing plane and (U, V, W) represents the direction vector of rotation axis. The rotation matrix is reached after normalizing the direction vector.

$$R = \begin{bmatrix} u^2 + (v^2 + w^2)\cos\varepsilon & uv(1-\cos\varepsilon) - w\sin\varepsilon & uw(1-\cos\varepsilon) + v\sin\varepsilon & 0 \\ uv(1-\cos\varepsilon) + w\sin\varepsilon & v^2 + (u^2 + w^2)\cos\varepsilon & vw(1-\cos\varepsilon) - u\sin\varepsilon & 0 \\ uw(1-\cos\varepsilon) + w\sin\varepsilon & vw(1-\cos\varepsilon) + u\sin\varepsilon & w^2 + (u^2 + v^2)\cos\varepsilon & 0 \\ 0 & 0 & 0 & 1 \end{bmatrix} \quad \text{Eq. 8}$$

After the coordinate transformation, each slicing plane is limited to be consistent with the printing plane during AM fabrication, which is crucial for multi-directional slicing algorithm as well as a multi-directional AM system. Each sliced contour is also available as the output of slicing algorithm with the transformation process. Using DCS, the 3D model is discretized into a series of 2D layers with coordinate information, where the centroid as well as the normal direction of each layer are determined. Thus, each layer can be manipulated independently by mathematically operating this incorporated data information. For example, as discussed in more detail below, one can identify two principle axes of an elliptical shaped layer, such that the orientation (Θ) of the ellipse in a global reference frame is accessible. This allows one to realize the conformal geometry printing.

Figure 11:
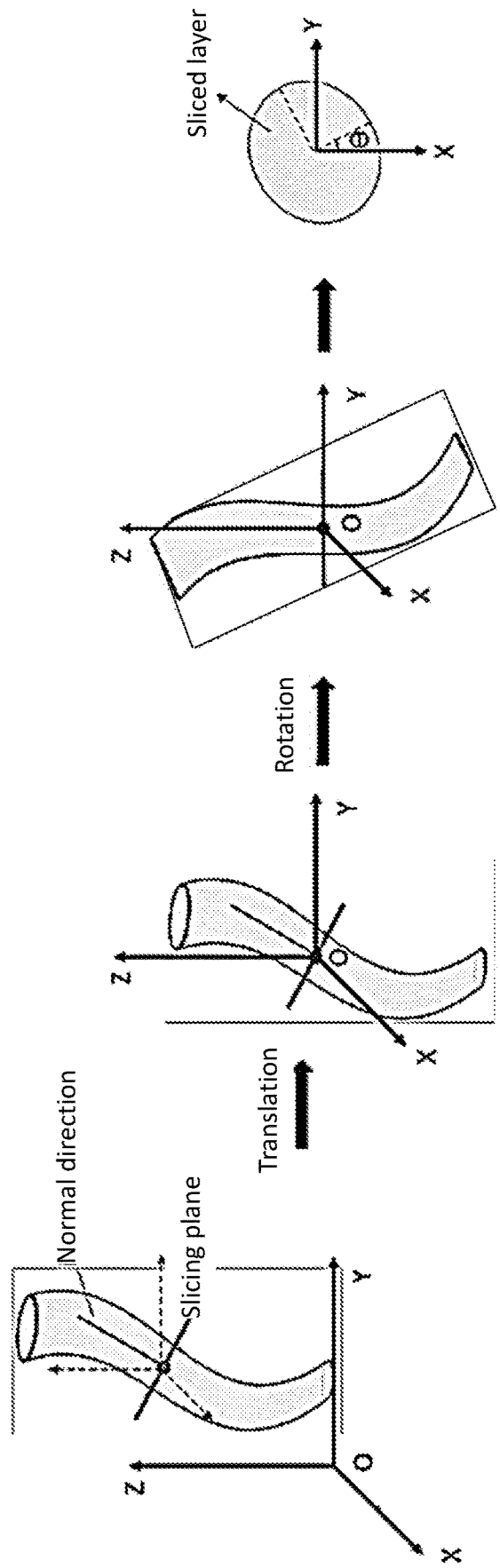
FIG. 11 depicts the transformation from the sliced layer to the printing plane in accordance with an illustrative embodiment.

FIG. 11 depicts the transformation from the sliced layer to the printing plane in accordance with an illustrative embodiment. Since DCS allows the creation of discrete layers with variable directions, each sliced layer is translated and rotated to the printing (curing) plane. Meanwhile, the sliced contour in 3D Cartesian coordinate systems is transformed into the two-dimensional image. The right portion of FIG. 11 shows an example of an elliptical shaped layer, where one can readily figure out the two principle axes (in red lines) and the orientation (Θ) of the ellipse in global reference.

Figure 12:
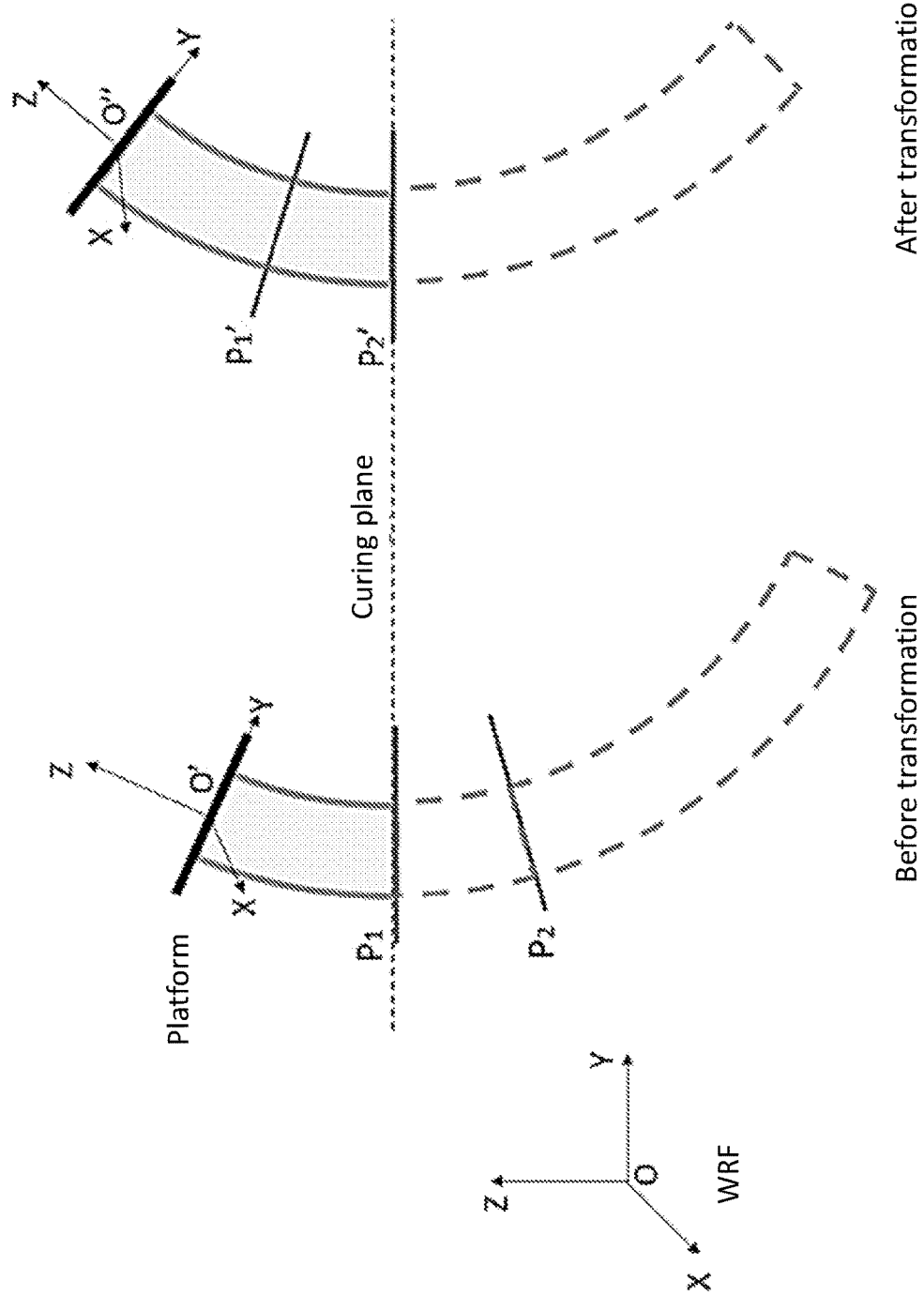
FIG. 12 depicts the transformation of the platform from a current layer to the next layer in accordance with an illustrative embodiment.

To achieve 6-DOF manipulation, the spatial position and pose of the print receiving platform is transformed dynamically from the current layer to the next layer. FIG. 12 depicts the transformation of the platform from a current layer to the next layer in accordance with an illustrative embodiment. By recognizing the position and the pose of current layer ($P_1$) as well as the next layer ($P_2$), the robot arm is controlled to move and rotate from current layer to next layer as the printing proceeds. In the proposed system, the world reference frame (WRF) is used as the fixed coordinate system for transformation and the origin of WRF is located at the center of the platform. Before transformation, $P_1$=(x1, y1, z1, A1, B1, C1) is defined as the current layer and $P_2$=(x2, y2, z2, A2, B2, C2) is the next layer to be printed. Here, x, y, and z represent the coordinate for the centroid point of each layer in WRF while A, B, and C are angles between the normal vector of each layer and the X, Y, and Z axes of the WRF, respectively. The coordinate translation for the position of platform can be calculated by equation 9, while equation 10 shows the rotation for the orientation of the platform.

$$D_t = T'D \quad \text{Eq. 9:}$$

$$S_r = R'S_r \quad \text{Eq. 10:}$$

where $D_t$ and $S_r$ are the position matrix and pose matrix of the platform after the transformation. T' is translation matrix, R' is the rotation matrix, $D=[0\ 0\ 0\ 1]^T$, and S is the current pose of the platform. Equation 11 gives the rotation matrix while α and β are the rotation angles around the X-axis and the Y-axis, respectively. Equation 12 gives the solution for α and β.

$$R' = \begin{bmatrix} 1 & 0 & 0 \\ 0 & \cos\alpha & -\sin\alpha \\ 0 & \sin\alpha & \cos\alpha \end{bmatrix} \cdot \begin{bmatrix} \cos\beta & 0 & \sin\beta \\ 0 & 1 & 0 \\ -\sin\beta & 0 & \cos\beta \end{bmatrix} \quad \text{Eq. 11}$$

$$\begin{bmatrix} 1 & 0 & 0 \\ 0 & \cos\alpha & -\sin\alpha \\ 0 & \sin\alpha & \cos\alpha \end{bmatrix} \cdot \begin{bmatrix} \cos\beta & 0 & \sin\beta \\ 0 & 1 & 0 \\ -\sin\beta & 0 & \cos\beta \end{bmatrix} \cdot \quad \text{Eq. 12}$$

$$\begin{bmatrix} 1 & 0 & 0 \\ 0 & \cos\delta & -\sin\delta \\ 0 & \sin\delta & \cos\delta \end{bmatrix} \cdot \begin{bmatrix} \cos\varphi & 0 & \sin\varphi \\ 0 & 1 & 0 \\ -\sin\varphi & 0 & \cos\varphi \end{bmatrix} \cdot \begin{bmatrix} \cos A_2 \\ \cos B_2 \\ \cos C_2 \end{bmatrix} = \begin{bmatrix} 0 \\ 0 \\ 1 \end{bmatrix}$$

Here, δ and φ are the rotation angles for the current layer, which can be solved by equation 13. Then the current pose matrix of S can be known from equation 14 below:

$$\begin{bmatrix} 1 & 0 & 0 \\ 0 & \cos\delta & -\sin\delta \\ 0 & \sin\delta & \cos\delta \end{bmatrix} \cdot \begin{bmatrix} \cos\varphi & 0 & \sin\varphi \\ 0 & 1 & 0 \\ -\sin\varphi & 0 & \cos\varphi \end{bmatrix} \cdot \begin{bmatrix} \cos A_1 \\ \cos B_1 \\ \cos C_1 \end{bmatrix} = \begin{bmatrix} 0 \\ 0 \\ 1 \end{bmatrix} \quad \text{Eq. 13}$$

$$S = \begin{bmatrix} 1 & 0 & 0 \\ 0 & \cos\delta & -\sin\delta \\ 0 & \sin\delta & \cos\delta \end{bmatrix} \cdot \begin{bmatrix} \cos\varphi & 0 & \sin\varphi \\ 0 & 1 & 0 \\ -\sin\varphi & 0 & \cos\varphi \end{bmatrix} \cdot \begin{bmatrix} 0 \\ 0 \\ 1 \end{bmatrix} \quad \text{Eq. 14}$$

The translation matrix T' is defined by Equation 15 while $\Delta x'=x'_1-x'_2$, $\Delta y'=y'_1-y'_2$, and $\Delta z'=z'_1-z'_2$. The expression $[x'_1\ y'_1\ z'_1]^T$ is the position after the rotation for current layer and the calculation is given by equation 16. The expression $[x'_2\ y'_2\ z'_2]^T$ is the position after the rotation for next layer while equation 17 shows the process. Thus, the matrix T' can be achieved from equation 15 and equation 18.

$$T' = \begin{bmatrix} 1 & 0 & 0 & \Delta x' \\ 0 & 1 & 0 & \Delta y' \\ 0 & 0 & 1 & \Delta z' \\ 0 & 0 & 0 & 1 \end{bmatrix} \quad \text{Eq. 15}$$

$$\begin{bmatrix} 1 & 0 & 0 \\ 0 & \cos\delta & -\sin\delta \\ 0 & \sin\delta & \cos\delta \end{bmatrix} \cdot \begin{bmatrix} \cos\varphi & 0 & \sin\varphi \\ 0 & 1 & 0 \\ -\sin\varphi & 0 & \cos\varphi \end{bmatrix} \cdot \begin{bmatrix} x_1 \\ y_1 \\ z_1 \end{bmatrix} = \begin{bmatrix} x'_1 \\ y'_1 \\ z'_1 \end{bmatrix} \quad \text{Eq. 16}$$

$$\begin{bmatrix} 1 & 0 & 0 \\ 0 & \cos\alpha & -\sin\alpha \\ 0 & \sin\alpha & \cos\alpha \end{bmatrix} \cdot \begin{bmatrix} \cos\beta & 0 & \sin\beta \\ 0 & 1 & 0 \\ -\sin\beta & 0 & \cos\beta \end{bmatrix} \cdot \quad \text{Eq. 17}$$

$$\begin{bmatrix} 1 & 0 & 0 \\ 0 & \cos\delta & -\sin\delta \\ 0 & \sin\delta & \cos\delta \end{bmatrix} \cdot \begin{bmatrix} \cos\varphi & 0 & \sin\varphi \\ 0 & 1 & 0 \\ -\sin\varphi & 0 & \cos\varphi \end{bmatrix} \cdot \begin{bmatrix} x_2 \\ y_2 \\ z_2 \end{bmatrix} = \begin{bmatrix} x'_2 \\ y'_2 \\ z'_2 \end{bmatrix}$$

$$\begin{bmatrix} \Delta x' \\ \Delta y' \\ \Delta z' \end{bmatrix} = \begin{bmatrix} x'_1 \\ y'_1 \\ z'_1 \end{bmatrix} - \begin{bmatrix} x'_2 \\ y'_2 \\ z'_2 \end{bmatrix} \quad \text{Eq. 18}$$

After transformation, the platform is moved from O' to O" and the pose is changed, where O' and O" are the origin points of the WRF before and after transformation, respectively. Then each current layer is adjusted to be perpendicular to the projection direction and located on the curing plane during the printing process.

It is noted that the out-of-plane rotation of the slicing planes can result in nonuniform thickness of the building layers. As discussed above, one solution to this problem is to restrict the rotation angle between the neighboring slicing planes to be less than 0.04° when executing the dynamic conformal slicing (DCS) algorithm. Considering the printing area of 1.93×1.08 mm$^2$, this will result in the thickness variation of 10 μm from center to the corner of the full field of view (FOV). This represents a very conservative estimation as typical lateral dimension of 3D printed parts can be much smaller. Thus, one can set the layer thickness to be 20 µm which allows extra curing to be fully concealed within the following layer. In one embodiment, grayscale UV exposure can be implemented to spatially control the curing depth. Through a precise calibration of the speed-working curve model, it is possible to reduce or eliminate the overlapping among the adjacent fabricating layers, which can be helpful to further improve the surface smoothness and internal mechanical homogeneity.

Figures 13A, 13B:
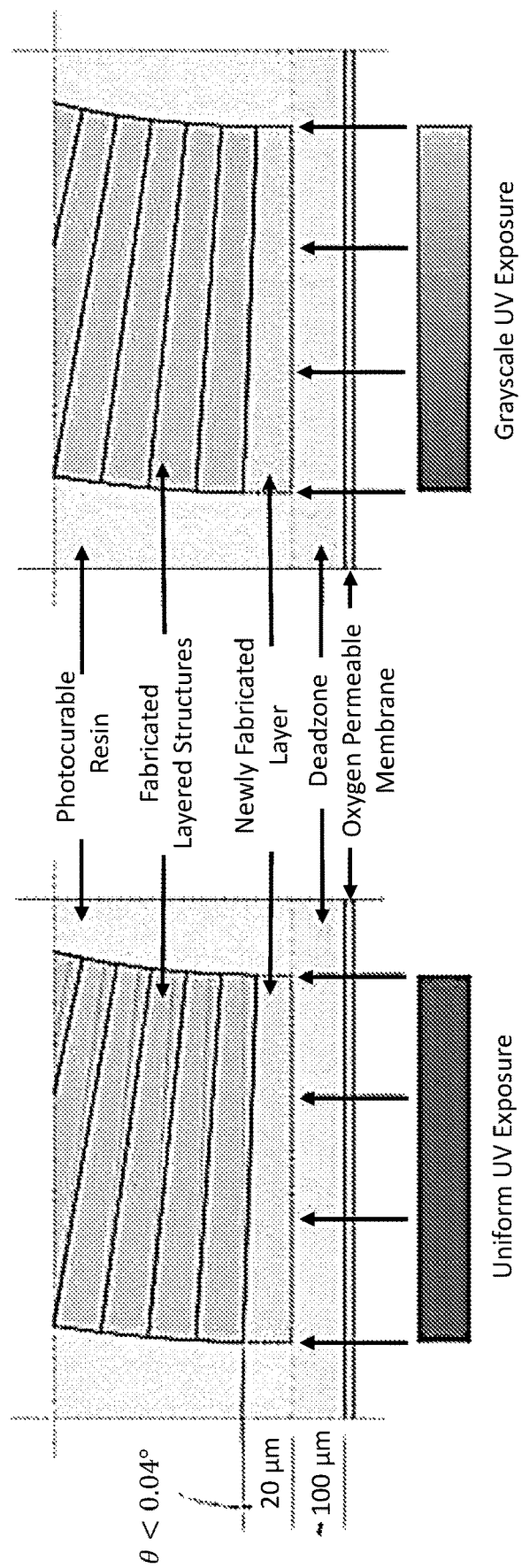
FIG. 13A shows that the use of uniform UV exposure will result in the overlapping between the neighboring building layers due to the out-of-plane rotation in accordance with an illustrative embodiment.
FIG. 13B depicts implementation of grayscale UV exposure to spatially control the curing depth in accordance with an illustrative embodiment.

FIG. 13 depicts the effect of non-uniform building layer thickness due to the out-of-plane rotation. Specifically, FIG. 13A shows that the use of uniform UV exposure will result in the overlapping between the neighboring building layers due to the out-of-plane rotation in accordance with an illustrative embodiment. However, with the rotation angle less than 0.04° at a 20-um slicing layer thickness, the overlapping region has been fully concealed within the newly fabricated layer, without compromising the surface roughness. FIG. 13B depicts implementation of grayscale UV exposure to spatially control the curing depth in accordance with an illustrative embodiment.

One can also divide the solid model into a series of structural modules, which can be printed sequentially via a distinct printing path being optimized specifically for each module. FIG. 14 depicts a test case. Specifically, FIG. 14A depicts a multi-axis printing strategy and includes a building block CAD model inset in accordance with an illustrative embodiment. FIG. 14B depicts a successfully fabricated structure made using a multi-axis printing technique in accordance with an illustrative embodiment. The scale bar in FIG. 14B is 2 mm. The overall structure constitutes multiple downfacing features that cannot be avoided by simply re-orienting the part printing direction. Using the reported FF-PuSL system, the complete structure can be fabricated via the sequential 3D printing of the structure modules shown as the inset of FIG. 14A. As also shown in FIG. 14A, the whole structure can be divided into 6 structural modules, and each module can be printed with a distinct printing path to mitigate the issue for printing downfacing features. As a result, the design can be faithfully fabricated without the need for the supporting structures, as shown in FIG. 14B.

Figure 15B:
FIG. 15B depicts a slicing plane having the presence of multiple materials therein in accordance with an illustrative embodiment.
Figure 15C:
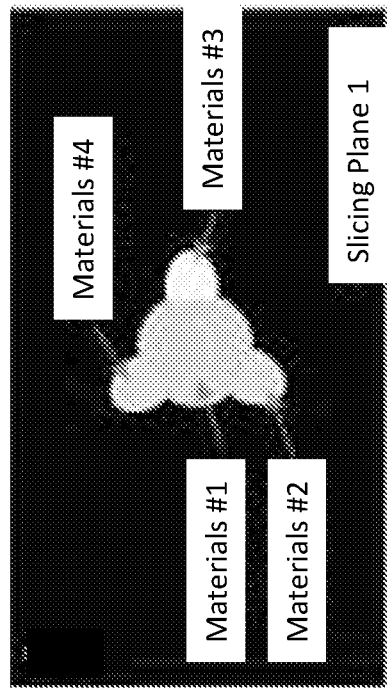
FIG. 15C depicts another slicing plane having the presence of multiple materials therein in accordance with an illustrative embodiment.
Figure 15A:
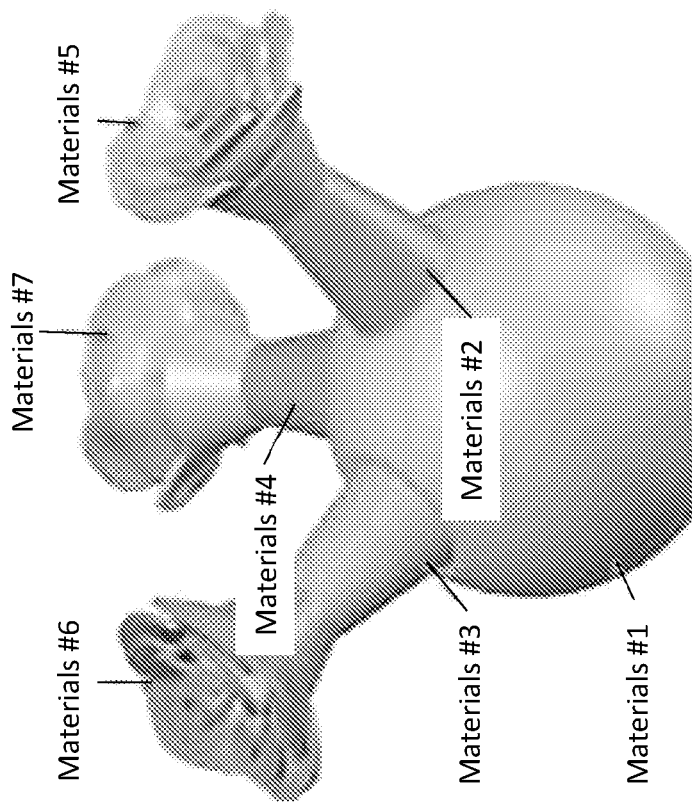
FIG. 15A depicts a representative multi-materials design in accordance with an illustrative embodiment.
Figure 15D:
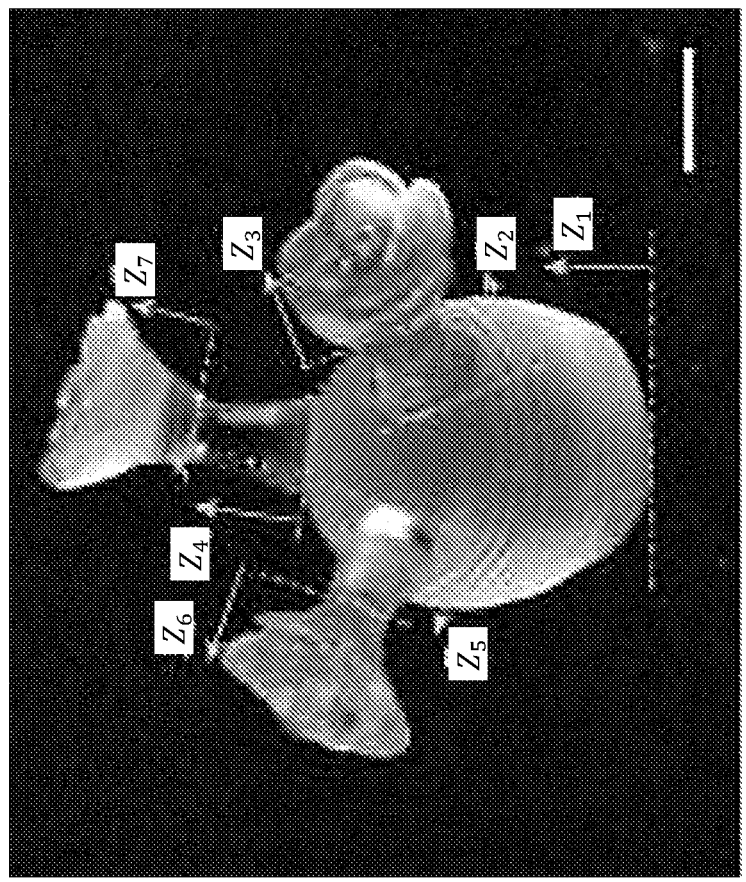
FIG. 15D depicts a successful multi-material 3D printing process employing multi-axis printing to fabricate the shape of FIG. 15A in accordance with an illustrative embodiment.

The modular printing process discussed above offers a unique solution to ease the burden for multi-materials printing. FIG. 15A depicts a representative multi-materials design in accordance with an illustrative embodiment. FIG. 15B depicts a slicing plane having the presence of multiple materials therein in accordance with an illustrative embodiment. FIG. 15C depicts another slicing plane having the presence of multiple materials therein in accordance with an illustrative embodiment. FIG. 15D depicts a successful multi-material 3D printing process employing multi-axis printing to fabricate the shape of FIG. 15A in accordance with an illustrative embodiment. As shown, the design includes 7 distinct regions constituting different materials. Using the conventional planar slicing method, the representative slicing layers shown in FIGS. 15B-15C indicate the presence of multiple materials within the same slicing layer. As noted above, it can be extremely time-consuming to switch printing materials for every single slicing layer, using the reported methods of bath switching or through the use of pumps, blades, or manual input. In contrast, the proposed multi-axis printing method offers the freedom to vary printing direction can greatly reduce the time that it takes to make multi-material prints.

Using the proposed system, one can treat each multi-material domain as one module and then construct them in the same fashion as a modular printing process. This can be done as a mask projection stereolithography process or with uCLIP. By strategically planning the printing direction of each module, one can minimize the overlapping of the multi-materials in the same printing layer. As a result, the fabricated structure shown in FIG. 15D only involved switching of the materials of 6 times, which is significantly faster than the traditional unidirectional constrained surface printing processes.

Figure 16:
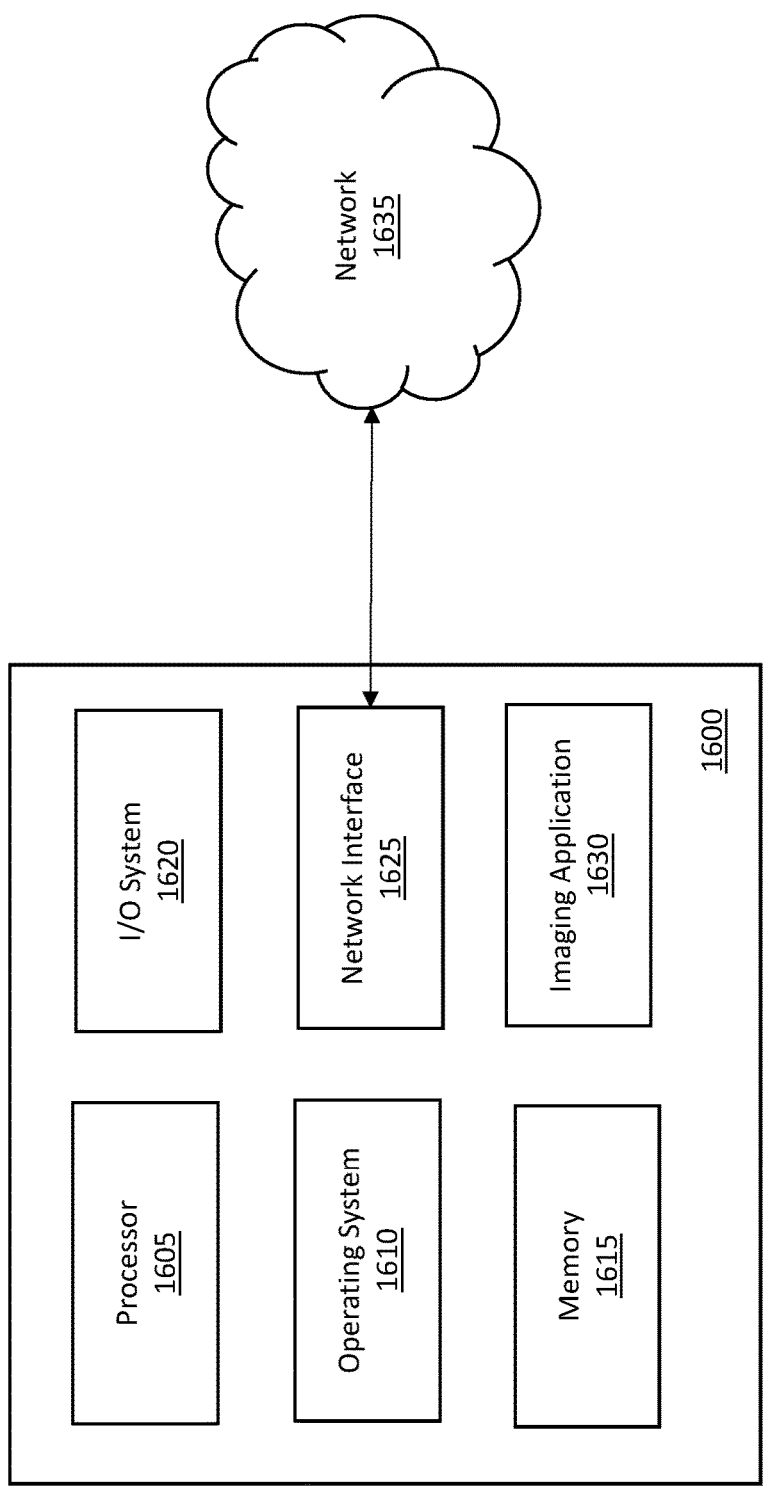
FIG. 16 is a block diagram of a computing device in communication with a network in accordance with an illustrative embodiment.

As discussed, any of the operations described herein can be performed by a computing system that includes a processor, memory, transceiver, interface, etc. The memory can store an operating system and computer-readable instructions. Upon execution by the processor, the computer-readable instructions implement the operations described herein. The transceiver is used to receive/transmit data, and the interface allows a user to program and control the system. As an example, FIG. 16 is a block diagram of a computing device 1600 in communication with a network 1635 in accordance with an illustrative embodiment. The computing device 1600 includes a processor 1605, an operating system 1610, a memory 1615, an input/output (I/O) system 1620, a network interface 1625, and an imaging application 1630. In alternative embodiments, the computing device 1600 may include fewer, additional, and/or different components. The components of the computing device 1600 communicate with one another via one or more buses or any other interconnect system. The computing device 1600 can be any type of networked computing device such as a laptop computer, desktop computer, smart phone, tablet, dedicating computing sub-system, etc.

The processor 1605 can be any type of computer processor known in the art, and can include a plurality of processors and/or a plurality of processing cores. The processor 1605 can include a controller, a microcontroller, an audio processor, a graphics processing unit, a hardware accelerator, a digital signal processor, etc. Additionally, the processor 1605 may be implemented as a complex instruction set computer processor, a reduced instruction set computer processor, an $x_{86}$ instruction set computer processor, etc. The processor is used to run the operating system 1610, which can be any type of operating system.

The operating system 1610 is stored in the memory 1615, which is also used to store programs, algorithms, network and communications data, peripheral component data, the imaging application 1630, and other operating instructions and/or data. Alternatively, the imaging application 1630 may be remote from the computing device 1600. The memory 1615 can be one or more memory systems that include various types of computer memory such as flash memory, random access memory (RAM), dynamic (RAM), static (RAM), a universal serial bus (USB) drive, an optical disk drive, a tape drive, an internal storage device, a non-volatile storage device, a hard disk drive (HDD), a volatile storage device, etc.

The I/O system 1620 is the framework which enables users and peripheral devices to interact with the computing device 1600. The I/O system 1620 can include a mouse, a keyboard, one or more displays, a speaker, a microphone, etc. that allow the user to interact with and control the computing device 1600. The I/O system 1620 also includes circuitry and a bus structure to interface with peripheral computing devices such as imaging systems, power sources, USB devices, peripheral component interconnect express (PCIe) devices, serial advanced technology attachment (SATA) devices, high definition multimedia interface (HDMI) devices, proprietary connection devices, etc. In an illustrative embodiment, the I/O system 1620 also presents an interface to the user such that the user is able to input data and printing parameters. The data and/or printing parameters can also be received from another device via the network 1635.

The network interface 1625 includes transceiver circuitry that allows the computing device 1600 to transmit and receive data to/from other devices such as remote computing systems, printers, servers, websites, etc. The network interface 1625 also enables communication through the network 1635, which can be one or more communication networks. The network 1635 can include a cable network, a fiber network, a cellular network, a wi-fi network, a landline telephone network, a microwave network, a satellite network, etc. The network interface 1625 also includes circuitry to allow device-to-device communication such as Bluetooth® communication.

The imaging application 1630 can include software in the form of computer-readable instructions which, upon execution by the processor 1605, performs any of the various operations described herein such as receiving data, controlling a printer, performing calculations, etc. The imaging application 1630 can be stored in the memory 1615 as discussed above. In an alternative implementation, the imaging application 1630 can be remote or independent from the computing device 1600, but in communication therewith.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A system for additive manufacturing comprising:
a multi-material vat that includes a plurality of resins;
a robotic arm that provides at least six degrees of freedom of motion, wherein the robotic arm moves with the six degrees of freedom to draw resin out of the multi-material vat to form an object;
a processor operatively coupled to the robotic arm and configured to control movement of the robotic arm in the six degrees of freedom; and
wherein the processor is configured to execute a dynamic conformal slicing (DCS) algorithm to form a conformal map of a surface model of the object, wherein the processor uses the DCS algorithm to discretize the surface model into a plurality of slicing layers, and wherein the DCS algorithm minimizes a cross-section area of each slicing layer in the plurality of slicing layers by varying angles of a surface normal.

2. The system of claim 1, further comprising a motorized stage to which the multi-material vat is mounted, wherein the motorized stage moves the multi-material vat to control which resin from the plurality of resins is used.

3. The system of claim 1, further comprising a solvent bath, wherein the robotic arm is configured to rinse the object in the solvent bath prior to switching from a first resin to a second resin.

4. The system of claim 3, wherein the first resin and the second resin are both included in the multi-material vat.

5. The system of claim 1, further comprising an oxygen-permeable membrane at a bottom of the multi-material vat.

6. The system of claim 1, wherein the DCS algorithm is configured to identify a centroid of each slicing layer and form a spline of the conformal map by sequentially connecting the centroids of the plurality of slicing layers.

7. The system of claim 6, wherein the DCS algorithm is configured to represent each slicing layer by a local frame with respect to a reference frame.

8. The system of claim 1, wherein the DCS algorithm is configured to approximate each slicing layer as a shape that is represented by a conformation vector.

9. The system of claim 8, wherein the conformation vector comprises (u, v, Θ), where u and v represent dimensions along two principle axes of the shape, and wherein Θ represents in-plane rotation of the two principle axes.

10. The system of claim 8, wherein the shape comprises an ellipse.

11. The system of claim 1, further comprising a light engine configured to receive bitmaps corresponding to the plurality of slicing layers on a layer-by-layer basis during manufacture of the object.

12. A method for performing additive manufacturing, the method comprising:
storing, in a memory, a design of an object to be printed;
controlling, by a processor operatively coupled to the memory, a position of a multi-material vat that includes a plurality of resins;
controlling, by the processor, a robotic arm having at least six degrees of freedom of motion such that the robotic arm moves with the six degrees of freedom to draw resin out of the multi-material vat to form the object; and
executing, by the processor, a dynamic conformal slicing (DCS) algorithm to form a conformal map of a surface model of the object;
using the DCS algorithm to discretize the surface model into a plurality of slicing layers; and
minimizing, by the processor, a cross-section area of each slicing layer in the plurality of slicing layers by varying angles of a surface normal.

13. The method of claim 12, wherein controlling the position of the multi- material vat comprises controlling a motorized stage to which the multi-material vat is mounted.

14. The method of claim 12, further comprising controlling, by the processor, the robotic arm to rinse the object in a solvent bath during fabrication and prior to switching from a first resin to a second resin.

15. The method of claim 12, further comprising identifying, by the processor, a centroid of each slicing layer in the plurality of slicing layers and forming a spline of a conformal map by sequentially connecting the centroids of the plurality of slicing layers.

16. A system for additive manufacturing comprising:
a multi-material vat that includes a plurality of resins;
a robotic arm that provides at least six degrees of freedom of motion, wherein the robotic arm moves with the six degrees of freedom to draw resin out of the multi-material vat to form an object;

a processor operatively coupled to the robotic arm and configured to control movement of the robotic arm in the six degrees of freedom; and wherein the processor is configured to execute a dynamic conformal slicing (DCS) algorithm to form a conformal map of a surface model of the object, wherein the processor uses the DCS algorithm to discretize the surface model into a plurality of slicing layers, and wherein the DCS algorithm is configured to approximate each slicing layer as a shape that is represented by a conformation vector.

17. The system of claim 16, wherein the conformation vector comprises (u, v, Θ), where u and v represent dimensions along two principle axes of the shape, and wherein Θ represents in-plane rotation of the two principle axes.

18. The system of claim 16, wherein the shape comprises an ellipse.

19. The system of claim 16, wherein the DCS algorithm is configured to represent each slicing layer by a local frame with respect to a reference frame.

20. The system of claim 16, further comprising a light engine configured to receive bitmaps corresponding to the plurality of slicing layers on a layer-by-layer basis during manufacture of the object.

* * * * *